Figure 1:
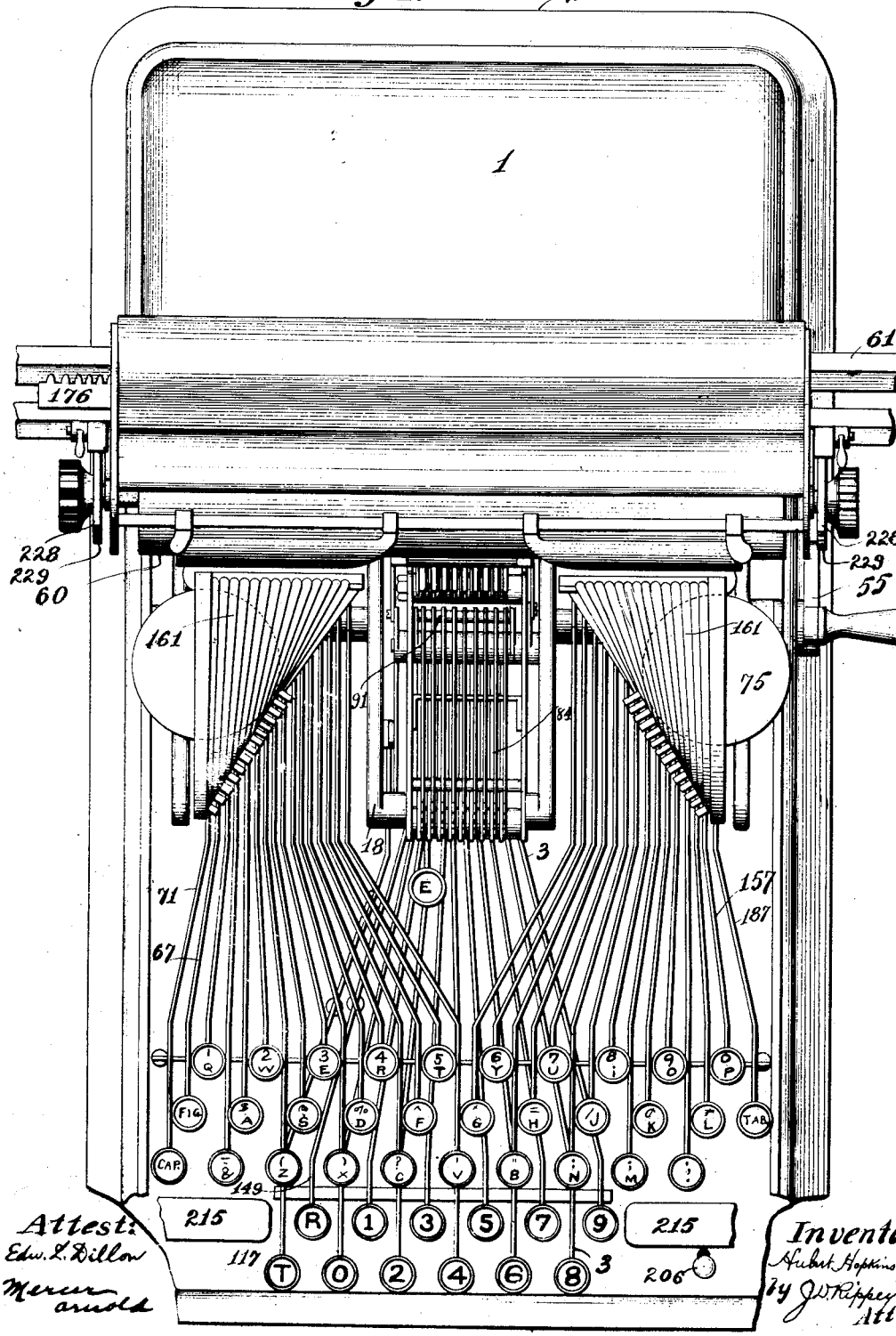

H. HOPKINS.
ADDING AND WRITING MACHINE.
APPLICATION FILED JAN. 24, 1903.

1,039,130.

Patented Sept. 24, 1912.
14 SHEETS—SHEET 1.

H. HOPKINS.
ADDING AND WRITING MACHINE.
APPLICATION FILED JAN. 24, 1903.

1,039,130.

Patented Sept. 24, 1912.

14 SHEETS—SHEET 2.

Attest:
Edw. L. Dillon
Mercer Arnold

Inventor
Hubert Hopkins
by J. L. Rippey Atty

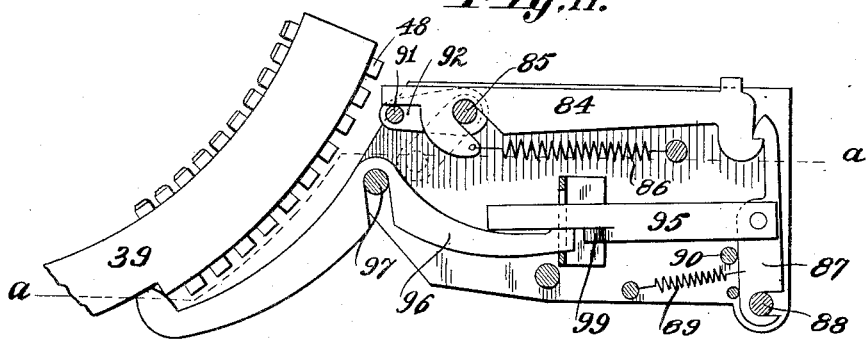
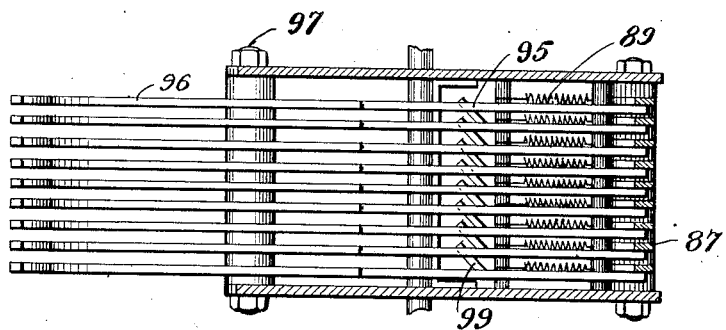
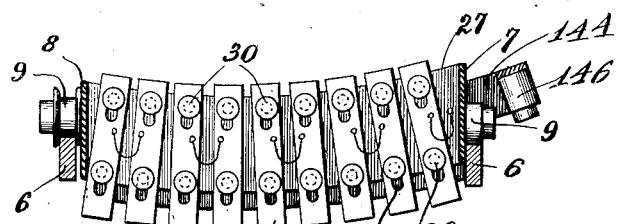

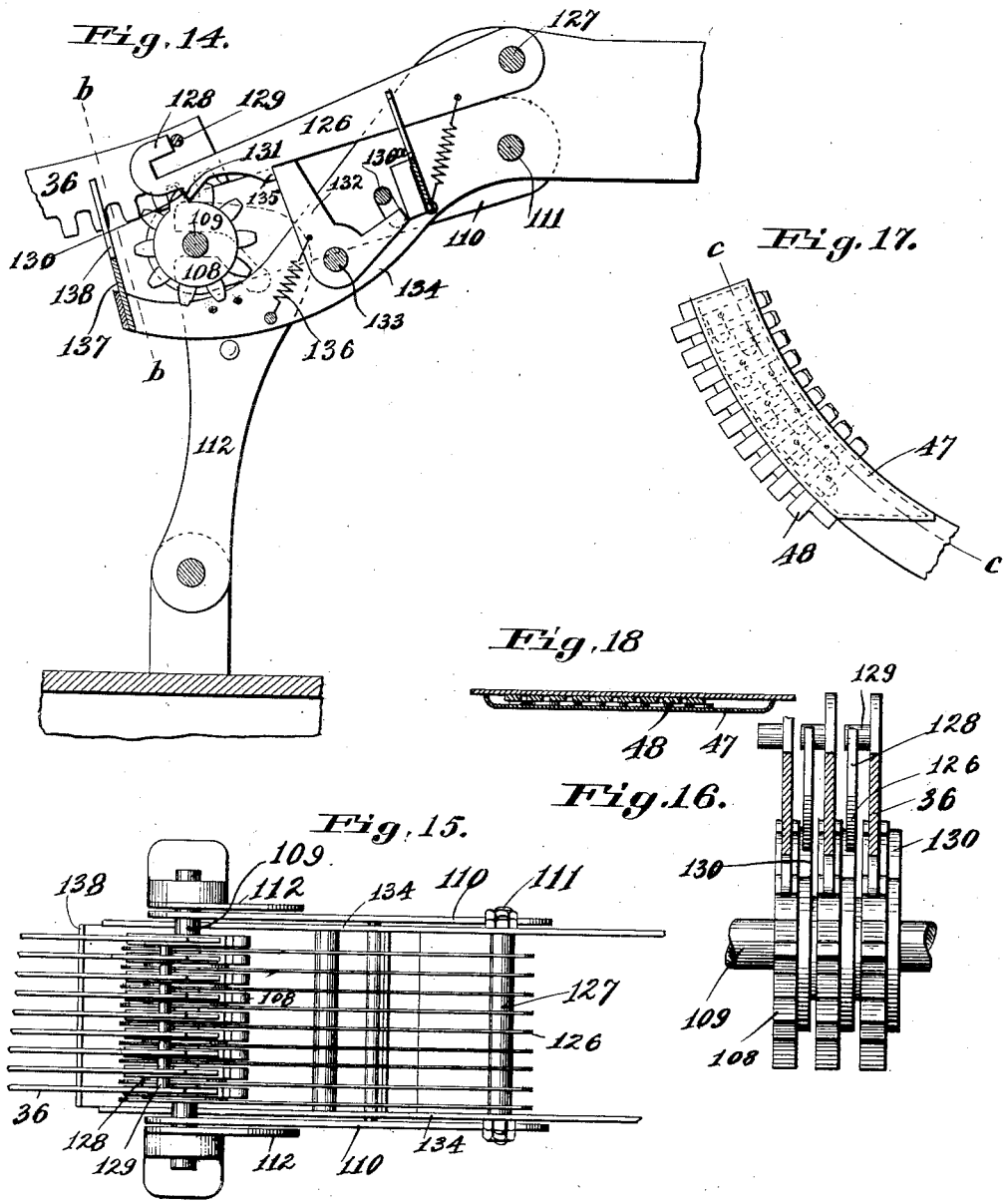

H. HOPKINS.
ADDING AND WRITING MACHINE.
APPLICATION FILED JAN. 24, 1903.

1,039,130.

Patented Sept. 24, 1912.
14 SHEETS—SHEET 12.

Attest:
Edw. L. Dillon
Mercer Arnold

Inventor:
Hubert Hopkins
by J. O. Rippey
Att'y.

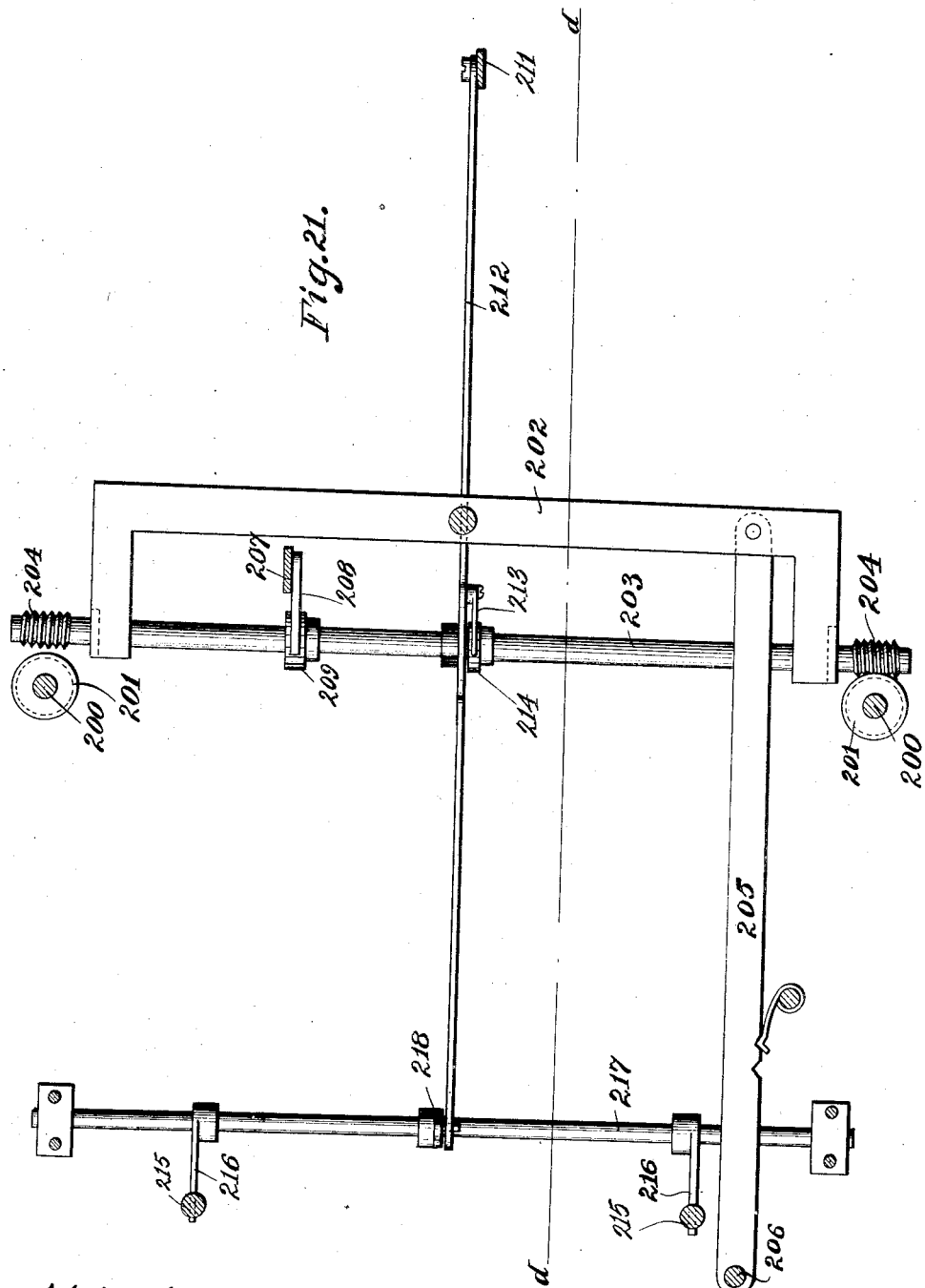

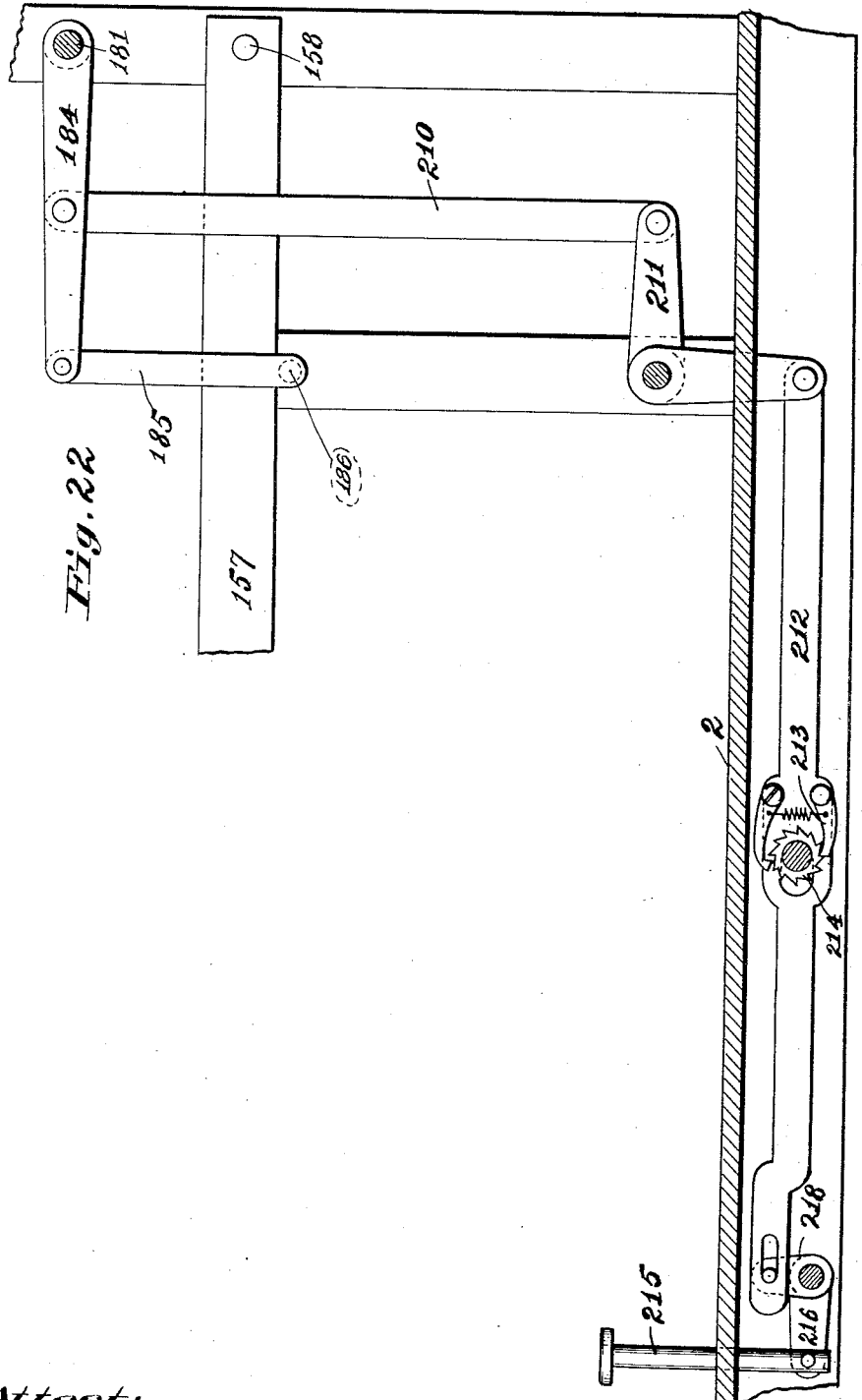

UNITED STATES PATENT OFFICE.

HUBERT HOPKINS, OF ST. LOUIS, MISSOURI, ASSIGNOR TO ADDOGRAPH MANUFACTURING COMPANY, A CORPORATION OF MISSOURI.

ADDING AND WRITING MACHINE.

1,039,130.           Specification of Letters Patent.      Patented Sept. 24, 1912.

Application filed January 24, 1903. Serial No. 140,390.

*To all whom it may concern:*

Be it known that I, HUBERT HOPKINS, a citizen of the United States, residing at St. Louis, Missouri, have invented a new and useful Improvement in Adding and Writing Machines, of which the following is a specification.

This invention relates to adding and writing machines; and it consists of the novel construction, combination and arrangement of parts hereinafter shown, described and claimed.

One object of this invention is to produce an adding and writing machine, comprising a word printing department, and an adding and recording department, having a common platen upon which commercial sheets of paper of any required width can be introduced and upon which joint written and arithmetical records, can be printed without previous adjustment of the two departments relative to each other, or intermediate connecting or actuating devices.

Another object is to produce a machine, of the class mentioned having registering devices connected (separably) with the totalizing wheels which are operated thereby and in which the carrying is accomplished by the movement of the registering devices, without intermediate actuating devices.

A further object is to produce an adding and writing machine having the type bars of the writing department arranged with a space wherein the adding-mechanism-type move, to record in alinement with written records, produced by the writing department.

A further object is to provide a machine of the class mentioned having the recording devices of both departments arranged to print on the front of the platen to produce joint alined visible results.

A still further object is to produce a machine of the class mentioned in which the recording devices of the adding department are located within the machine and movable toward the printing point of the writing type bars on the platen so that both departments will record along the same line when it is desired to obtain or produce a joint result, such as identified items.

Another object is to produce an integral adding and writing machine of compact and simplified construction adapted for use for either purpose at any time without previous adjustment, all the records being made upon a common platen and visible to the operator as written.

Another object is to provide an adding machine comprising a series of type-carriers, a series of hammers for coöperating with the type to produce type impressions, a releasable latch for holding each hammer in idle adjustment, a carriage whose operation is necessary before said type-carriers and said hammers may be operated, and means for releasing one hammer for each type-carrier operated while the remaining hammers remain latched.

Another object is to produce an adding machine comprising a platen arranged to hold paper, a series of type-carriers operable to record numbers on paper on said platen, a series of devices for driving the type, which are carried by said type-carriers, toward said platen to record, a carriage whose operation is necessary before said type-carriers may be operated, and mechanism for operating all of said elements.

Another object is to produce an adding machine comprising a laterally-movable platen arranged to hold paper, a series of type-carriers, a series of movable type on each type-carrier, a series of drivers or hammers for driving the movable type toward the platen to record on said paper, adding mechanism operable to add the numbers recorded, means for moving the paper in line spacing in any position of the carriage, and a carriage whose operation is necessary before said type-carriers and said adding mechanism may be operated.

A further object is to produce an adding machine comprising listing and adding mechanism operable to list and add numbers, a laterally-movable paper carriage, automatic means for feeding the paper in line spacing in any position of the paper carriage as an incident to the listing of a number, and a carriage whose operation is necessary before any number may be listed.

Other objects will appear from the following description, and do not require specific mention, reference being made in the description to the accompanying drawings, in which—

Figure 2:
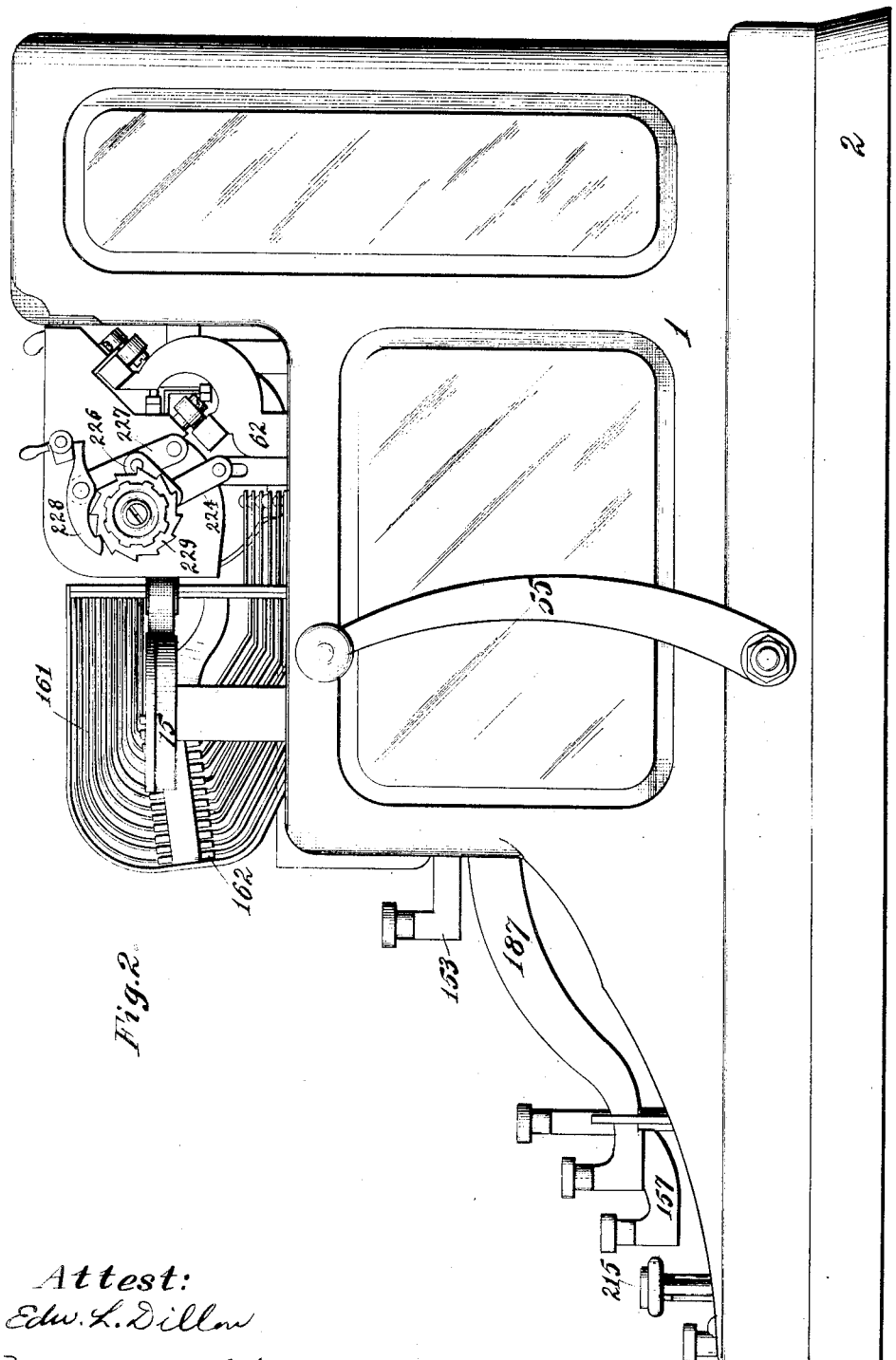
Figure 3:
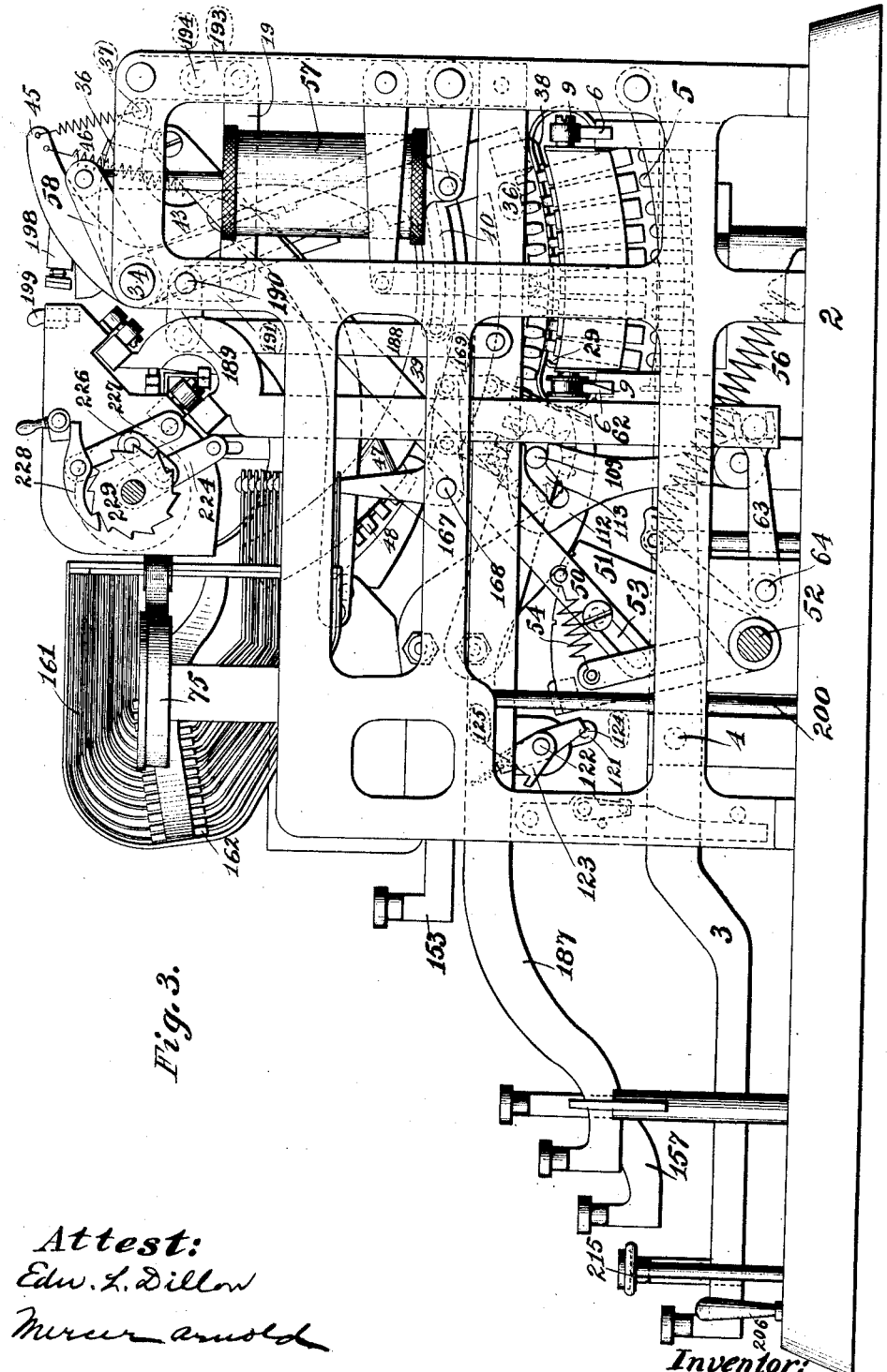
Figure 4:
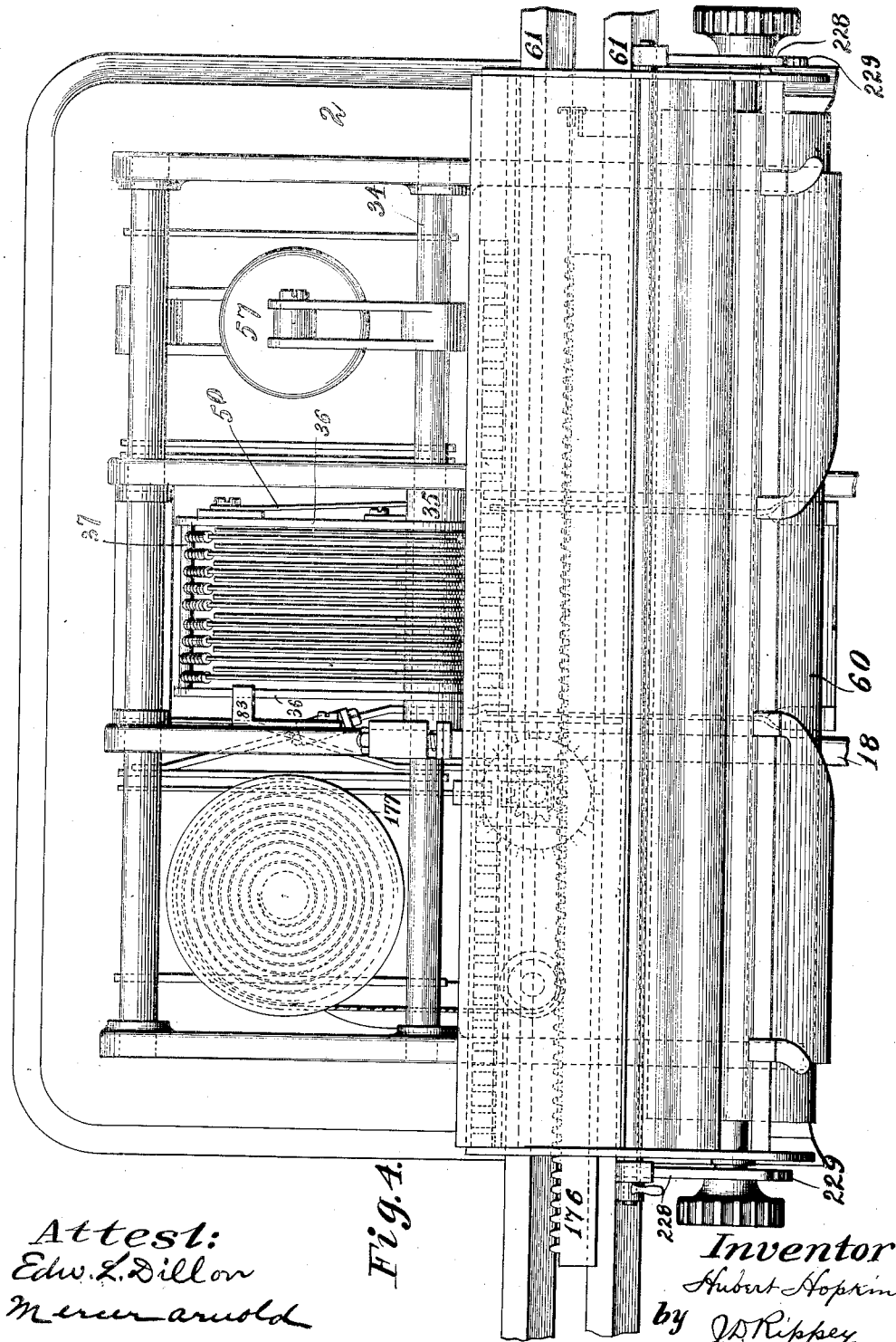

Figure 1 is a plan view of the machine, Fig. 2 is a side elevation, Fig. 3 is a right side elevation with the case removed. Fig.

Figure 5:
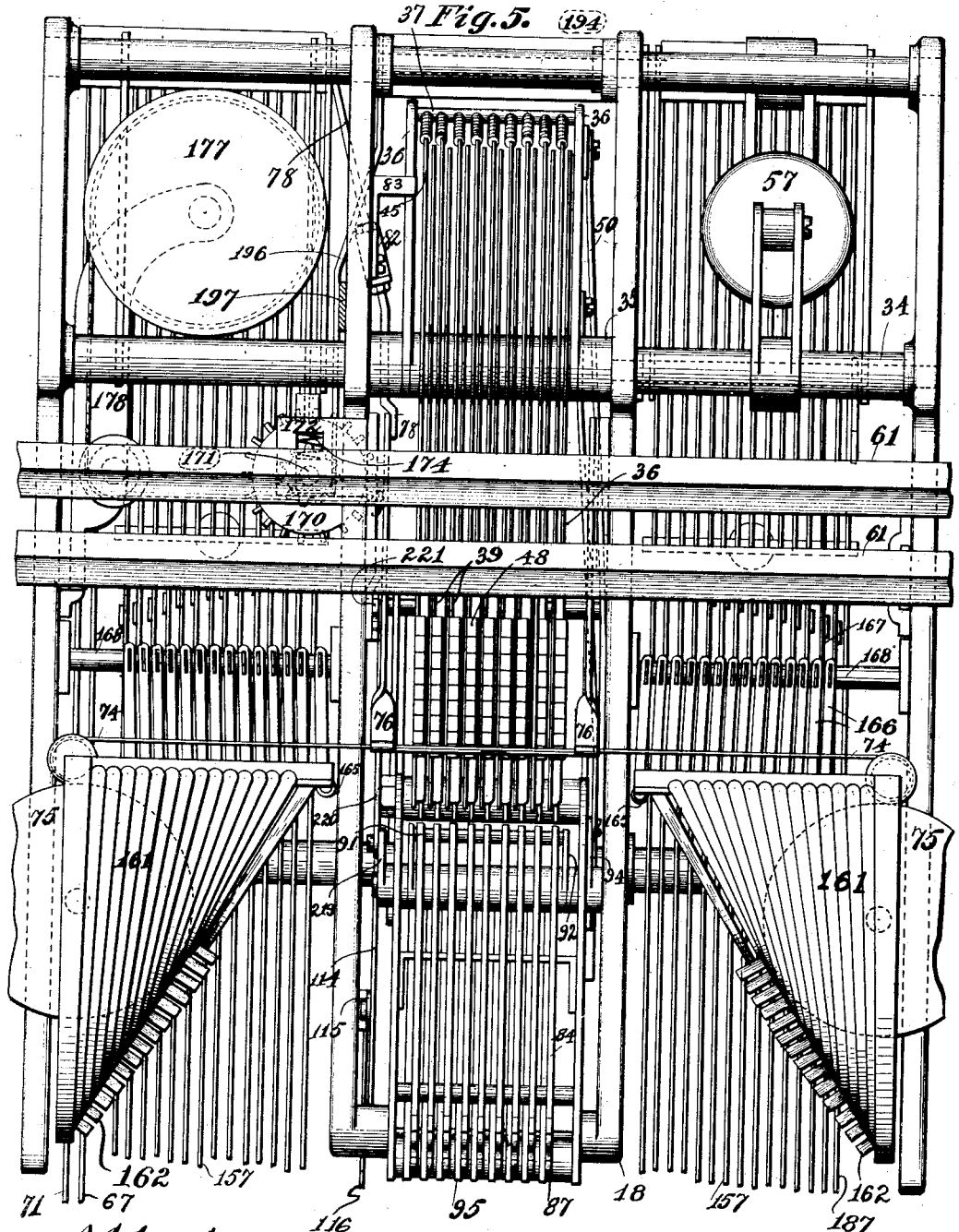
Figure 6:
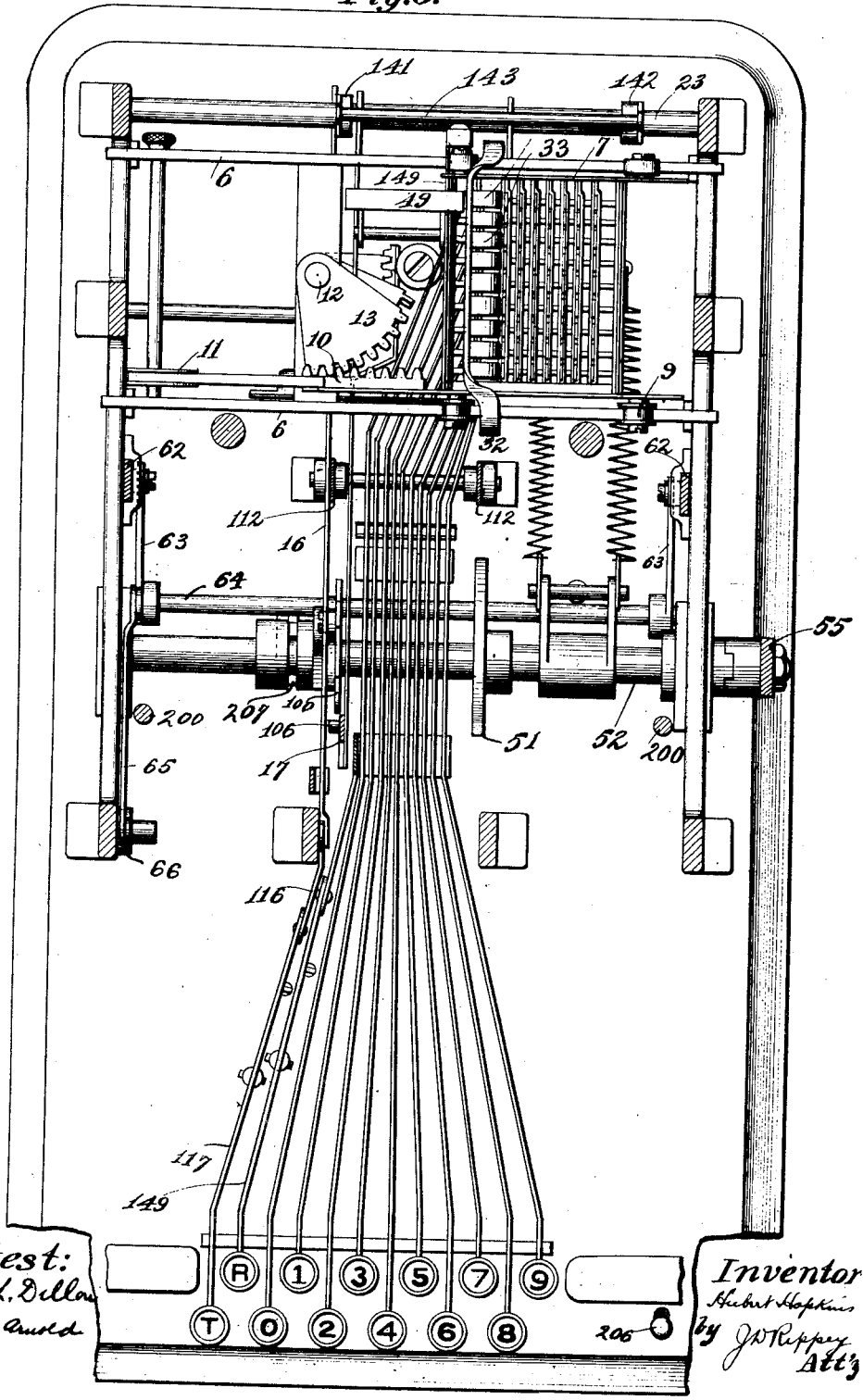
Figure 7:
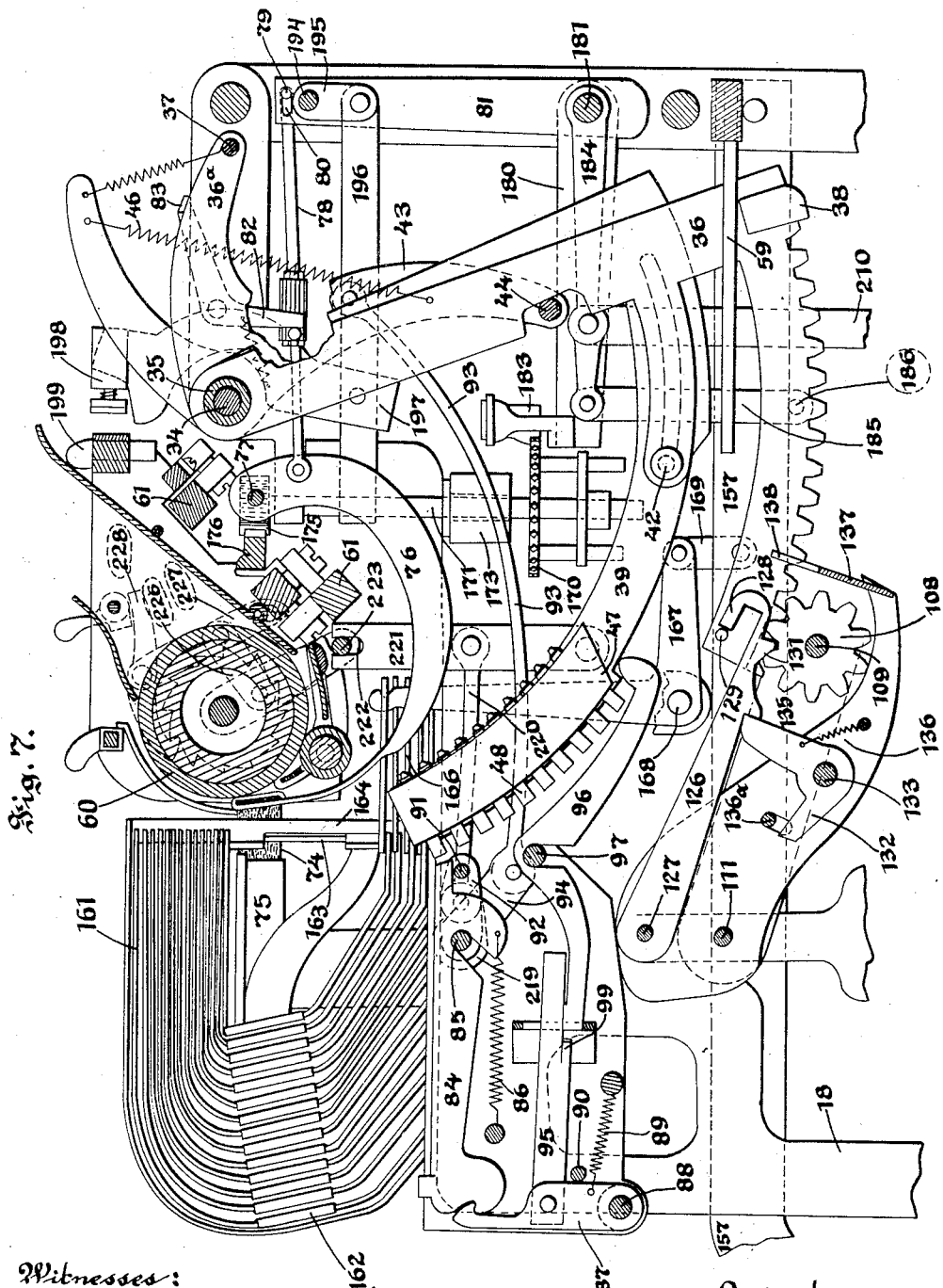
Figure 8:
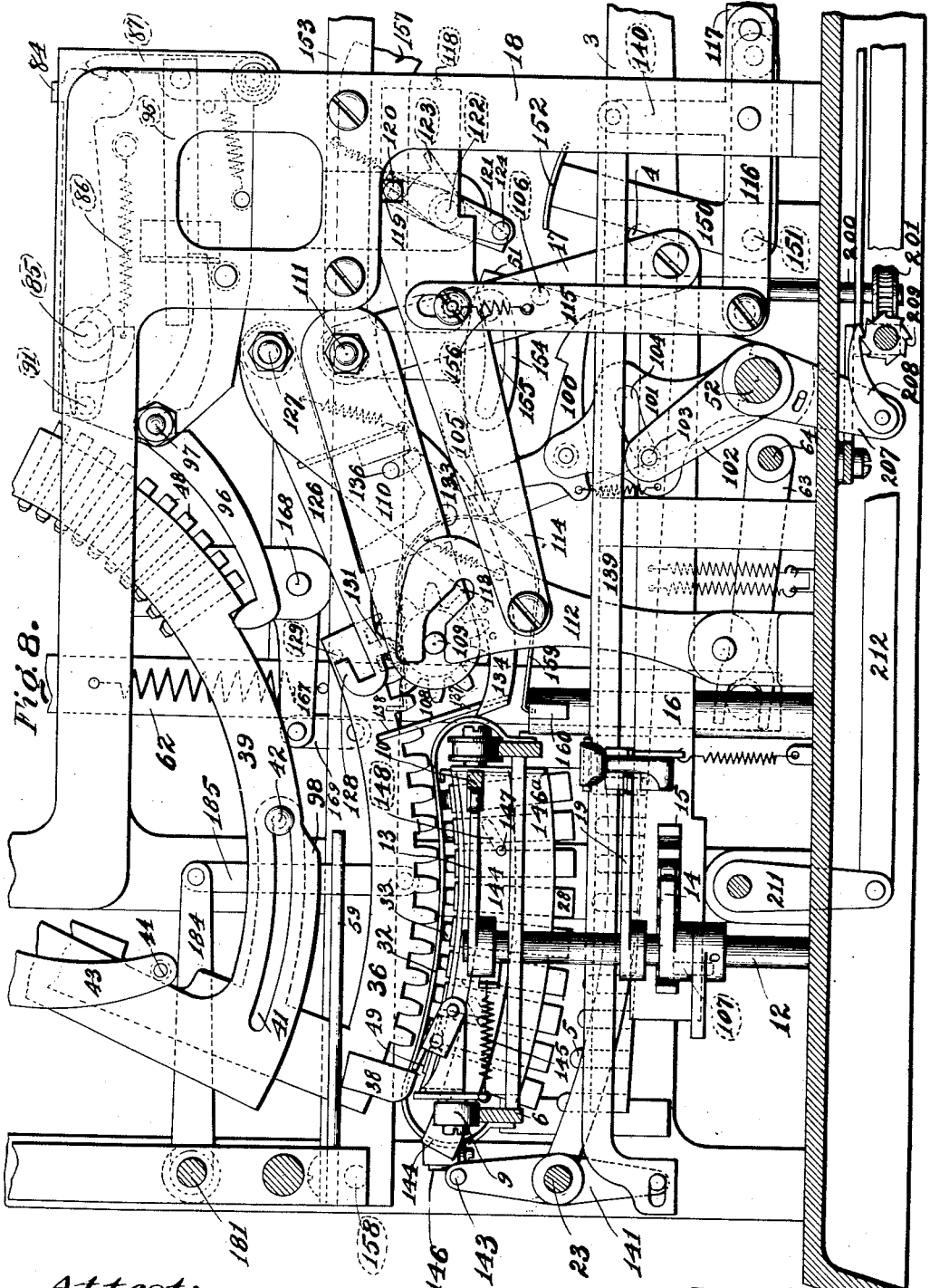
Figure 9:
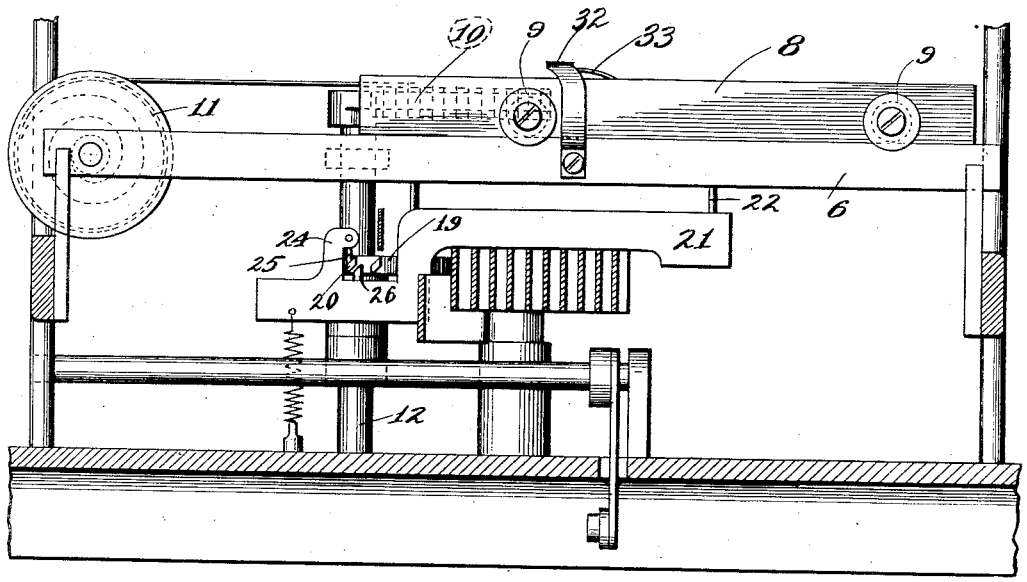
Figure 10:
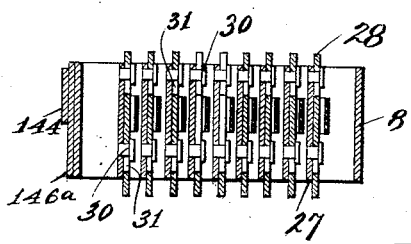
Figure 19:
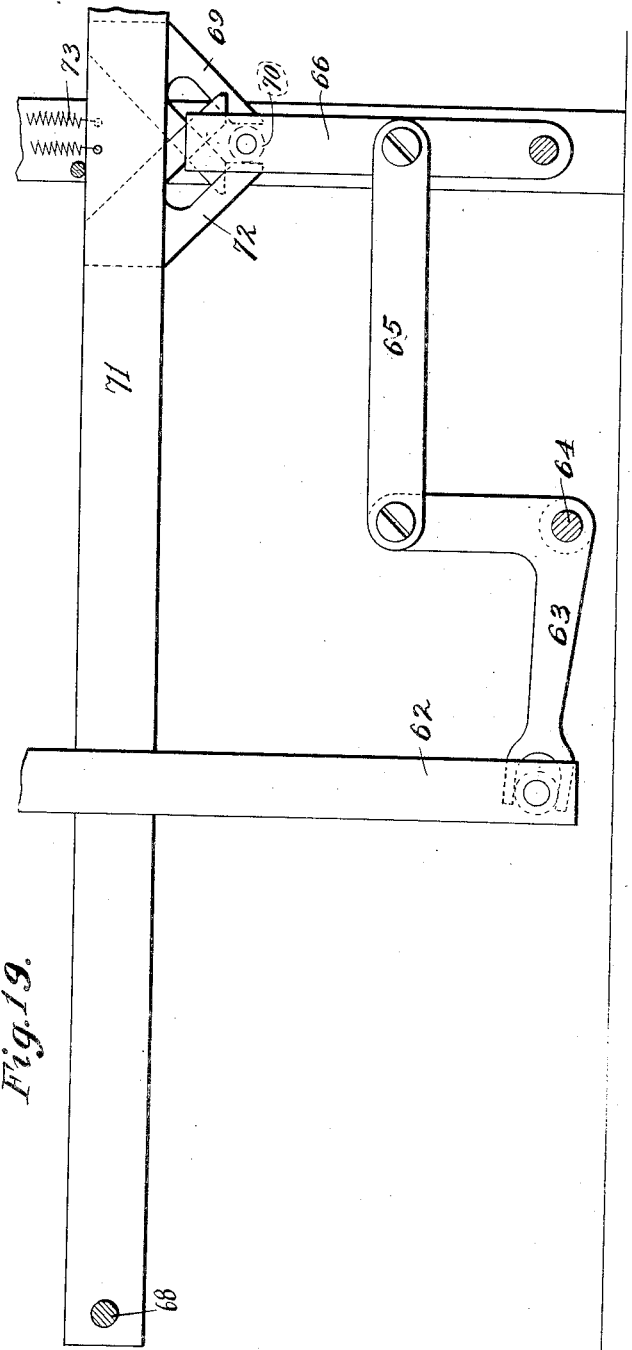
Figure 20:
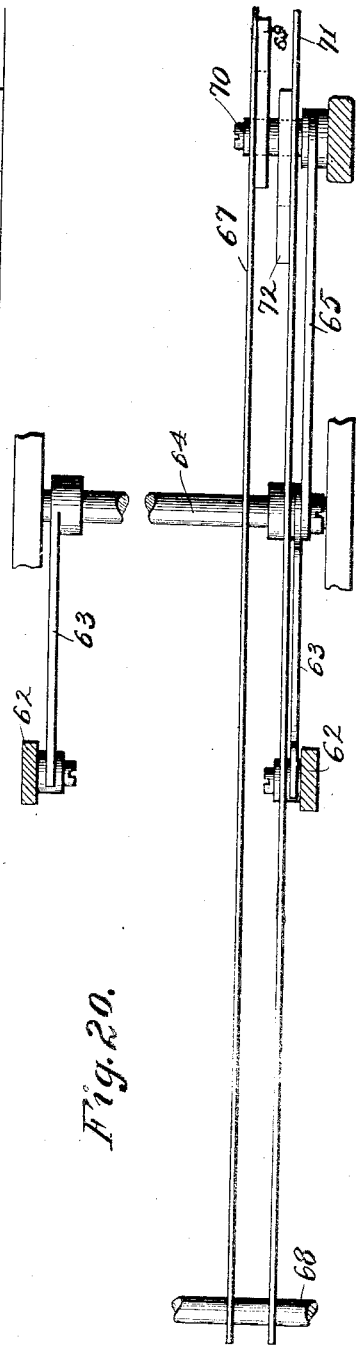

4 is a top view of the rear end of the machine the case being removed. Fig. 5 shows the interior of the machine the platen and associated parts being removed. Fig. 6 is a plan view showing the arrangement of the adding department key levers and the pin carriage. Fig. 7 is an enlarged sectional view of the upper part of the machine with portions of the supporting frame work omitted to avoid confusion of lines. Fig. 8 is a view showing the gear and type sectors in their relation to the movable pin carriage. Fig. 9 is a cross sectional view of the lower part of the adding department showing the escapement controlling the pin carriage. Fig. 10 is a cross section of the pin carriage. Fig. 11 shows the relation of the type sectors, the printing hammers and the intervening tripping device. Fig. 12 is a plan view of the tripping devices which release the hammers, taken on section line $a$—$a$ of Fig. 11. Fig. 13 is a longitudinal section of the pin carriage. Fig. 14 is a detail view of part of the carrying devices. Fig. 15 is a plan view of the same. Fig. 16 is a sectional view on the line $b$—$b$ of Fig. 14. Fig. 17 is a side view of the end of one of the type carriers. Fig. 18 is a sectional view taken on line $c$—$c$ of the preceding figure. Fig. 19 shows the devices for raising and lowering the platen. Fig. 20 is a plan of the same mechanism. Fig. 21 shows the ribbon feed mechanism, located under the base of the machine. Fig. 22 is a sectional view taken on line $d$—$d$ of Fig. 21.

The case 1 is located on the base 2 and incloses the operative mechanism of both departments—the writing and adding. When the machine includes the typewriting mechanism the keys of the two departments preferably form separate groups for convenience and to avoid confusion to the operator though it will be apparent that the adding and listing mechanism, with the common or joint platen shown, or other suitable platen for supporting and feeding the paper, may be employed without being combined with the typewriting mechanism. In fact, such separate construction and use of the adding mechanism is contemplated, as well as in combination with the typewriting mechanism. The key levers 3 of the adding department are preferably grouped below those of the writing department and are spaced at convenient distances but converge centrally about midway of the front and rear of the machine and are pivoted upon a common support 4 rearward from which they extend parallel as clearly shown in Fig. 6. Behind the pivot 4 the key levers are bent as shown so that their rear ends are in longitudinal alinement. All the key levers except the "9" have vertical projections 5 rigid with their rear ends, the upper extremities thereof being circularly alined.

See Fig. 3. A track consisting of two parallel members 6, is supported transversely above the rear ends of the key bars 3. A frame or carriage, having a rear end plate 7 and a front end plate 8, is supported upon said track by means of the rollers 9. The plate 8 extends a distance to the left of the carriage and carries a rack 10 and said rack is attached to the spring motor 11 whereby the entire carriage is drawn from right to left across the machine on the track 6.

A vertical shaft 12 is supported by the base 2 of the machine leftward from the rear ends of the key levers 3 and carries a gear wheel or segment 13 in mesh with the rack 10. See Figs. 6 and 9. Another segment 14 is mounted loosely on the shaft 12 below the segment 13 and meshes with a rack 15 on the bar 16 extending longitudinally toward the front and having its latter extremity pivoted to a link 17 suspended from same portion of the inner side frames 18, which uphold most of the adding mechanism and are secured rigidly to the base 2.

A segmental plate 19 is attached to the shaft 12 above the segment 14 and has integral therewith on its outer edge, a series of ten teeth or projections 20 which are approximately diamond shaped in cross section. See Fig. 9. A bar or escapement member 21 rests transversely upon the key levers 3 and is connected to the arms or links 22, the rear ends of which are pivoted upon a cross rod or shaft 23. An arm or projection 24 is rigid with the left end of the member 21, and carries a depending hinged escapement member 25 of known construction, which normally engages with the projections 20 on the segment 19. A projection 26 is rigid with the member 21 and engages on the opposite side of the tooth 20 from the member 25. When the bar 21 is raised by a key lever the member 25 is disengaged from the tooth 20 and the motor 11 draws the stop frame to the left until the projection 26 stops the movement by engagement with the next tooth 20. Then when the key lever is released the lever 21 lowers to its normal position and disengages the projection 26 and again brings the member 25 into contact with the tooth 20. In this manner the escapement controlled by the key levers 3 governs the right to left movement of the stop frame or carriage across the machine.

The frame or carriage which as above referred to is carried by the plates 7 and 8, consists of a series of arcuate plates or metallic strips 27, Figs. 10 and 13 spaced at uniform distances and extending longitudinally in the machine. Each plate carries nine vertically movable pins 28 arranged in transverse rows. In idle or normal position the pins 28 on the plate 27 at the left are immediately over the projections 5 on the key levers 3, so that when any key lever, except the one representing "9," is struck one of the pins will be operated, the cross member 21 raised and the carriage moved one step leftward as above described, which results in the second longitudinal row of stops being brought over the projections 5. The nine pins 28 on each plate 27 represent the ten figures except the "9" for which no pin is provided, the key lever for that figure terminating below the cross member 21, which will be operated thereby in the same manner as by other keys. A special immovable part 29 is carried by the plate 8, said part being the "9" stop as hereinafter appears. The rear pin in each longitudinal row represents "0" and the other figures are represented in order by these movable pins except "9" which is provided for by the special immovable part 29, as stated. These pins are held by pins 30 rigid with the plates 27 and extending through slots 31 in the pins and thereby allowing the latter to move when struck by a key projection 5. Small springs may be provided to assist in retaining these pins in any position.

An arched member 32 Fig. 8 is secured to the parallel track bars 6 and is of sufficient height to allow the movable carriage to travel thereunder. A series of nine fingers or projections 33, one for each transverse row of pins 28, extend therefrom over the left side of the carriage, so that when the latter is restored to position the pins 28 will be forced down by passing under the fingers 33, to their normal position.

A shaft 34 is supported by the frame of the machine, a sleeve 35 encircles the same and a series of gear sectors or racks 36 is pivotally mounted upon said sleeve. See Fig. 7. An arm 36ª is rigid with each end of said sleeve, said arms projecting rearward and being connected by a rod 37. These gear sectors or racks are at sufficient height to permit the carriage to pass thereunder without obstruction, but each sector or rack has a downward projection 38 at its rear side which engages with the pins 28 as will be explained farther on. For each gear sector there is a corresponding type carrier 39 also supported on the sleeve 35 and the arcs of which are somewhat longer than the gear sectors in order to extend in front of the platen. Rigid or integral with each gear sector there is an arm 40 alongside of the corresponding type carrier in each of which is formed a slot 41 alongside of the arm 40. A pin or button 42 is secured to the end of the arm 40 and extends through the slot 41 thereby forming a loose connection between the racks and type carriage permitting the latter to have movement independent of the former for a short distance. This independent movement on the part of the type carriers, however, is limited by the length of the slots 41 as is evident. Two depending arms 43 extend from the sleeve 35 and support a rod 44 against the front edges of all the sector arcs and thereby holding them all at the limit of their backward movement and clearly alined. The upper ends of the type sectors have arms 45 projecting rearwardly and connected by springs 46 with the gear carriers so that when they are all released the type sectors will be drawn forward independent of the gear sectors till the button 42 rests in the rear end of the slot 41. The arms 45 are also connected with the rod 37 so that when the sleeve 35 is turned to move the arms 36 downward the type sectors will be drawn forward the rod 44 moving simultaneously.

The front ends of the type carriers carry frames 47 within which the types 48 are located, being movable and held actuated outward by small springs and having their printing faces inside the arc of the arcuate type-carriers. The gear sectors are held backward by a stop or retainer 49 supported by the movable carriage in front of the projections 38, and in alinement with the rear row of stops 28 which represent "0." When the carriage is at the right, which is its idle position, the stop 49 is in front of all the projections 38, but each stop to the left releases one sector, so that when the sleeve 35 is turned the sectors not held by the stop 49 will be drawn forward by their springs to which reference has heretofore been made. A link 50 Fig. 3 connects one of the arms 36 with a segment 51 attached to the main shaft 52 located near the base of the machine. The link 50 is provided near its lower end with a slot 53 through which the connecting pivot screw extends and a spring 54 forms a yielding connection so that when the main shaft is turned the link will be moved without a jerk. This results in rotation of the sleeve 35 and the rod 44 will be moved forward to release the sectors. A handle 55 is on the right end of the shaft 52, for operating purposes. Strong springs 56 are provided to restore the shaft 52 and the type-carriers and racks to position after each operation, but a dash-pot 57 is connected by an arm 58 to the sleeve 35 and prevents too forcible movement of the sectors by cushioning their return. Suitable guides 59 are provided to hold the sectors against lateral movement.

The platen 60 is common to both the adding and writing departments of the machine and is mounted in a suitable frame which travels upon a track consisting of two transverse rails 61. The said track is upheld by two vertical supports 62, Figs. 3 and 19 which are supported by the horizontal arms 63, whose front ends are rigid with a cross shaft 64 located preferably near the base. One of said arms 63 is extended vertically in the form of a bell-crank (see Fig. 19) and the upper end thereof is connected by a link 65 to a vertical member 66 pivotally supported by the frame of the machine near the front end.

The platen can be raised or lowered a short distance as required for writing purposes by means of two key levers provided for that purpose. The key lever 67 is pivoted near the rear end of the machine upon a rod 68—preferably near the left side—and carries a slotted cam member 69 Figs. 19 and 20 inclined downward toward the rear and terminating alongside of the vertical member 66, which is provided with a lateral projection 70 which is drawn into the slot in the cam 69 whenever the key bar 67 is depressed. As is manifest, this operation results in elevating the supports 62 and hence the platen (see Fig. 19). For lowering the platen a similar key bar 71 is provided and carries a forwardly depending slotted cam member 72 also adapted to receive the projection 70. Hence when the said key bar 71 is depressed the upper end of the member 66 is drawn rearwardly, the result being the lowering of the members 62 and the platen. The cam 69 controls the forward movement of the member 66 and the cam 72 its rearward movement. The key rails are upheld by strong springs 73 and when in idle position the member 66 is stationary and held so by the projecting ends of the cams 69 and 72 and the platen will be held midway of its vertical movement which is its normal position. The platen, however, is raised and lowered only for the writing department and not at all when the adding department alone is used.

A ribbon 74 extends across in front of the platen and winds upon spools 75, passing through guides 76 which are curved levers extending under the platen and having their rear ends rigid upon a rod 77 carried by the platen supports 62. The ribbon 74 is normally held below the center of the front of the platen (see Fig. 7) in order to expose the record as printed, but whenever any record is made the ribbon is raised in order to receive the stroke of the type. For raising the ribbon the rod 78 is provided and has one end pivoted or otherwise connected to one of the guides 76 and its rear end supported by a projection 79 extending into a short horizontal slot 80 in an upright member 81 pivotally supported by the frame of the machine. Said rod 78 is adjustable as to length by means of a turn buckle of known construction. The ribbon is normally held downward by gravity but whenever the type carriers are operated said ribbon is raised, the device for accomplishing this being the spring actuated bell-crank lever 82, Fig. 7 one arm of which rests against the rear side of a lateral projection on the rod 78 and the other arm of which has a projection 83 extending over one of the arms 36$^a$. When the parts are all in idle position as in Fig. 7, the lower arm of the lever 82 is held back by the arm 36, but when the latter is lowered the lever 82 is moved by its spring, the lower arm of said lever pushing the rod 78 forward and thereby raising the front ends of the guides 76 which hold the ribbon. The ribbon is thereby brought to center of the front of the platen and is held there till the record is made and the type-carriers are returned to their former position, at which time the lever 82 is moved backward by the arm 36 and the guides 76 and the ribbon 74 are restored by gravity to their lowered positions.

For striking the types 48 against the platen when the type-carriers are raised, a series of hammers Figs. 7 and 11—one for each type carrier—is mounted upon a shaft 85 supported transversely by the inner frames 18 in front of the sectors. The shaft 85 is rotatable and the hammers 84 are pivoted thereon and are actuated by springs 86 connecting them to same part of the frames. The hammers are held down by pawls 87 mounted on a rod 88 and held vertically by springs 89 and a rod 90. After each operation the hammers are restored to position by a rod 91 which is carried by two arms 92 rigid with the shaft 85, and rests under the rear ends of said hammers. Whenever the type-carriers are operated the rod 91 is lowered by means of a link 93 connecting one of the arms 43 with an arm 94 attached to one end of the shaft 85 so that the latter will be rotated at every operation of the type-carriers. It is manifest that the hammers will be restored to position by the rod 91 whenever the sectors and the link 50 move backward. An arm 95 is pivoted to each pawl 85, and said arms project rearward and rest upon the front ends of the levers 96 which are pivoted upon a shaft 97. The rear or lower ends of the levers 96 terminate adjacent to the lower edges of the type carriers 39 as shown, said sectors having shoulders 98 Fig. 8 which lower the rear ends of the levers 96 whenever the said sectors move forward farther than "0" position. Such operation raises the front end of the levers and thereby the ends of the arms 95, bringing the latter into the line of movement of the rod 91 which will push them forwardly and thereby release the pawls 87 from the hammers 84, the latter thereupon being thrown up by their springs 86 to strike the type and print. When the rod 91 is returned to position the hammers are drawn back and again locked with the pawls 87.

Each arm 95 is provided with a projection 99 extending under its neighbor at the right so that when one of the series is raised all others at its right will be raised also, thereby permitting any of the "0's" to be printed at the right of any other digit. This is done for the reason that any type-carrier which represents "0" in a number, is not moved far enough to operate its lever 96 which controls the hammers, but such hammer will be released as described.

The carriage is returned to its normal or idle position after any number is registered by a pawl 100 Fig. 8 carried by an arm 101 loose on the main shaft 52 alongside of another arm 102 rigid on said shaft. A pin 103 on the upper end of the arm 102 extends into a slot 104 in the arm 101 and hence will move the arm 101 when the main shaft is turned a sufficient distance. The pawl 100 is spring-actuated but is held down in opposition to its spring by a lug 105 in contact with one arm of said pawl and integral or rigid with some part adjacent to the pawl. However, when the shaft 52 is operated the front end of the pawl is raised by its spring and engages with a pin 106 on the link 17 and thus on the backward turning of the shaft 52 the link 17 and the bar 16 will also be moved, thereby turning the sector 14 against a projection 107 rigid with the shaft 12. This results in turning the shaft 12 and the gear sector 13 thereon forces the stop frame back and the upraised stops therein are lowered by the projections 33. A certain lost motion in the escapement member 25 permits the carriage to move a short distance leftward when the handle in the shaft 52 is released, in order that the first row of pins may be moved upward again by the key bars without striking against the projections 33. At the same time the pawl 100 strikes against the lug 105 and is released from the pin 106 and the link 17 and the bar 16 are returned to their former positions by means of a spring (not shown) connecting the said link 17 to one of the frames 18.

The adding machine or accumulator consists of a series of wheels 108 each with ten teeth representing the ten figures and normally in mesh with the gear sectors or racks. Said wheels are mounted on a shaft 109 supported by two plates 110, the front ends of which are pivoted to a rod 111. The shaft 109 and the rear ends of the plates 110 are upheld by two supports 112 pivotally supported by the base of the machine and provided with curved or angular slots 113 within which the ends of the shaft 109 rest. Normally the ends of the shaft are near the rear ends of the slots and when thus the wheels 108 are in mesh with the gear sectors or racks 36, but when the supports 112 are moved to the rear the shaft 109 will be lowered in the slots and the wheels 108 disengaged from the racks. A link 114 is pivoted to one of the supports 112 and the opposite or front end is upheld by a vertical link 115 the lower end of the latter being connected to the rear end of a bar 116. (See Fig. 8.) Said bar 116 is pivotally supported by one of the frames of the machine. The front end of the bar 116 is pivoted to the rear end of the total key bar 117. When the total key is lowered the rear end of the bar 116 is also lowered and this draws down the end of the link 114. Said link 114 abuts against a lug 118 on the frame and is thereby prevented from forward movement. A notch 119 is formed near the end of the link 114 and a pin 120 rigid with a small lever 121 rests in said notch. The lever 121 is rigid on a rotary pin 122 Fig. 3 supported by the frame and having on its outer end a bifurcated lever 123 also rigid therewith. A lever 124 is pivotally mounted on the outer end of the pin 122 and carries a projection 125 which lies between the forks of the lever 123. The lower end of the lever 124 is in the path of the movement of the segment 51 on the main shaft 52 and when said shaft is operated the segment thereon pushes forward the lower end of the lever 124 and thereby turns the pin 122. This results in the lever 121 pushing the link 114 rearward, which also pushes the supports 112 and draws the shaft 109 into the lower ends of the slots 113 and disconnects the wheels 108 from the racks 36. This occurs just before the racks start on their forward movement, so that the wheels 108 will not be disturbed. The continued forward movement of the segment 51 passes the same beyond the end of the lever 124, and then when the segment moves back to position the lever 124 is operated in the opposite direction and this draws the link 114 forward which operates the supports 112 and raises the wheels 108 into mesh with the gear sectors. This occurs just before the gear sectors start back, and hence their backward movement operates the wheels 108 to represent the number which had just been printed.

126 indicates the stop pawls or carrying levers which are pivotally mounted upon a rod 127 and which project toward the rear between the gear sectors 36. The rear ends of said pawls or levers are provided with hooks 128, the depth of which between the two arms is equal to one tooth on the sector or one tooth on the wheels 108. The sectors 36 are provided with pins 129 which strike against the ends of the hooks on the levers 126 and thereby stop the backward movement of the said sectors. On each wheel 108 except the one at the extreme left there is a lug or shoulder 130 being on the "0" teeth of said wheels. Each lever 126 is provided with a shoulder 131 in front of said lugs 130 and forming stops to stop the wheels in position when taking a total. The lugs 130 project toward the left, the lug on units wheel bearing against the pawl or lever 126 in tens place, and so on through the series. When the units wheel has added "9" it has turned nine-tenths of a revolution and is just passing under the front side of the shoulder 131 on the pawl or lever 126 in tens place. When another item is added to the one already represented, the lug 130 raises the pawl or lever 126 by passing under the shoulder 131 and thus raises the hook 128 above the pin 129 on the gear sector in tens place, and permits the sector to be drawn back by its spring until the pin 129 rests in the hook 128. This movement is equal to one tooth or digit and turns the totalizing wheel 108 in tens place a corresponding distance. Thus the carrying is accomplished from a lower to a higher order.

The pawls or levers 126 are upheld by pawls 132 pivoted on a rod 133 supported by the arms 134 which extend rearward under the wheels 108. Said pawls 132 rest against shoulders 135 on the pawls or levers 126 and when one of the latter is raised the pawl 132 is drawn under the shoulder 135 to uphold it, by means of a spring 136. However, when the wheels 108 are lowered the pawls 132 will be drawn to their normal position by a rod 136$^a$ carried by the plates 110 and extending across over integral horizontal arms of the pawls 132. This allows the pawls or levers 126 to return to their normal position and serve as stops for the sectors as above described. The arms 134 also carry a guide plate 137 on their rear ends, having a series of projections 138 extending between the gear sectors 36 to brace them.

139 indicates a rod of which the front end is pivoted to an arm 140 integral with the bar 116 and the rear end is pivoted to a lever 141 rigid upon the shaft 23 which is a rock shaft. See Fig. 8. Another lever 142 is also rigid on the shaft 23 and said levers carry a rod 143 at their upper ends. A slide 144 is supported by the plates 7, 8 and is actuated rearward by means of a spring 145 and carries a roller 146 on its rear end which operates against the rod 143 and from this it follows that when the total key is lowered the slide will be pushed forward. This also lowers the stop 49 below the projections 38 by drawing downward the plate 146$^a$ by pins 147 on the slide which operate in inclined slots 148 in said plate 146. This allows the sectors to move forward to register the total except those which are not required, such sectors being held by the lugs 130 against the shoulders 131.

To print the total the total key is lowered which draws down the link 114 removing it from the pin 120 so that the shaft 52 can be operated by the handle 55, and the parts thereby operated without the link 114 being pushed rearward. This leaves the wheels 108 in mesh with the gear sectors 36 and the latter will move forward and turn the wheels 108 until they are stopped by the lugs 130 striking against the shoulders 131 and such sectors as move will represent the total which will be printed in the manner set forth. The sectors not required to represent the total are held by the lugs 130 on the corresponding total wheels 108, bearing against the shoulders 131.

To repeat or reprint any number a number of times and in such cases to avoid striking the number on the key board every time, I provide a repeating key 149 pivoted to a bell crank lever 150 supported at 151. The vertical arm of said lever carries a shield 152 which when the key 149 is operated passes under the projection 106 and prevents the pawl 100 from engaging therewith and therefore the bar 16 is not moved and the stop frame remains stationary and the same number can be printed any number of times or until the key 149 is released.

For correction in event of error on the part of the operator in striking the keys, I provide an error key 153 pivotally mounted on the rod 111 adjacent to the link 17 and being in the form of a bell-crank and having a vertical arm 154 alongside of said link. The lower end of said arm has a slot 155 formed therein and a pin 156 on the link 17 projects into said slot. The error key when lowered will draw the link 17 and the bar 16 rearwardly and thereby restore the movable frame to its position at the right of the machine and thus the number therein represented is dissipated and the machine cleared from error, ready for work again.

Having described the adding department of the machine and traced its operation, I will now describe the writing department and explain how the two departments can be used together or separately as desired.

There is about the usual number of keys 157 and the bars of these keys are located at the sides of the adding department one half at each side. Said bars are pivoted at the rear of the machine upon a shaft 158 and are operated by being struck in the usual way, being upheld by springs 159 located between said bars and a cross member 160. The type bars 161 in the form shown each comprise two arms, one being horizontal and the other being on an incline, thereby forming an acute angle, the apex of which is closed by a type head 162, substantially vertical, and each being provided with three characters, those of ordinary and most frequent usage being in the center so that they can be used without raising or lowering the platen. The two arms of the type bars are rigid upon independent rotary rods 163 mounted vertically in the frames 164 rigid with the side frames of the machine. As may be clearly seen in Figs. 1 and 5, the type bars are arranged in two groups, one at each side, leaving an intervening space into which the type sectors move when the adding department of the machine is used, but the ends of the latter are always low enough to permit the type bars to strike the platen without interference. Both departments write on the center of the front of the platen and hence in alinement when used together for joint purposes, and the record of each is visible just as entered.

The lower arm of each type bar has a projection 165 which will throw the type bars inward when drawn to the rear, and strike the type against the ribbon or platen. To each projection 165 a link 166 is pivoted, said links extending rearwardly and being connected to vertical arms of the bell crank levers 167 mounted upon rods 168 located above the writing key bars 157. The opposite or horizontal arms of the levers 167 are connected to the key bars 157 by links 169. By these connections each writing key when struck will throw the corresponding type bar against the platen, and when the keys are released they are restored to position by the springs 159.

As shown, the type bars 161 are of graduated sizes so that the outer ones may freely pass over the inner ones without obstruction and to compensate for this difference and to render the "touch" of the keys uniform, the levers 167 are also of graduated length, their size being determined by the size of the corresponding type bar in inverse order.

The platen 60 is controlled by an escapement consisting of a toothed wheel 170 slidably mounted upon a vertical shaft 171 mounted in bearings 172 and 173. The bearing 172 is attached to a connection of the track 61 for the platen and hence is raised and lowered therewith. The bearing 172 has a spring 174 located therein which holds the shaft 171 forward but which permits the same to be forced rearwardly if desired. A pinion 175 is on the upper end of the shaft 171 and meshes with a rack 176 on the platen frame except when the shaft 171 is moved rearwardly in opposition to the spring 174. A spring motor 177, located at the left of the machine upon a frame 178 attached to one of the supports 62 and being raised and lowered therewith, is attached to the platen frame and draws it leftward when released by the escapement. The other members of the escapement are carried by a bracket 179 supported by the front end of an arm 180 which is rigid with a rock shaft 181. A lug 182 projects upward from the bracket 179 and a spring held member 183 projects downward therefrom and is normally in engagement with the teeth on the wheel 170. The rocking of the shaft 181 raises and lowers the bracket 179 and releases the wheel 170 so that the spring motor 177 can draw the platen to the left, step by step.

Two arms 184 are rigid with the shaft 181 at each side of the machine and depending links 185 are carried by the front ends of said arms and support rods 186, against the under side of the bars 157 Fig. 22, so that when the writing keys are operated the shaft 181 will be rocked and the escapement controlling the shaft 171 operated and the platen will travel leftward. Also the arm 81 is rigid with the shaft 181 and will raise the ribbon guides 76 against the platen by pushing the rod 78 forward every time a key is operated.

When both departments are used together the platen must be shifted frequently a comparatively long distance. That is to say, after the written record has been entered, the platen must be moved so that the corresponding arithmetical record will be printed in its column. This is done by disconnecting the escapement which controls the platen so that the platen can be moved the required distance at once by its controlling motor. For this purpose there is a tabulator key 187 Fig. 3 located at the right of the key board and pivoted at the rear. A link 188 has its lower end attached thereto and its upper end to a short arm 189 rigid with a rod 190 at one side of the machine. Another arm 191 is rigid with said rod and connected to a link 192 leading to an arm 193 on a rod 194 which also supports another arm 195 from which a hooked member 196 Figs. 5 and 7 extends in front of the shaft 171. The result then of operating the key 187 is that the parts just described will be moved and the member 196 be drawn rearward as will the shaft 171 also, in opposition to the spring 174, thereby disconnecting the pinion 175 from the rack 176. The member 196 is also pivoted to a support 197 and the latter is in turn pivoted to one of the inner frames, and at its upper end carries a spring cushioned stop 198 which is brought against the platen frame when the above parts are operated. Adjustable stop pins 199 are carried by the frame and strike against the stop 198 and thereby stop the platen. The release of the tabulator key restores all parts except the platen to their original locations.

The ribbon spools 75 are mounted upon vertical shafts 200 which project through the base of the machine and have gears 201 on their lower ends. A support 202 is pivoted to the under side of the base and supports a transverse shaft 203 provided with worm screws 204 adapted to mesh with the wheels 201, but arranged to mesh with only one at a time, so that the ribbon may be alternately wound from one spool to another. The support 202 can be turned so that either shaft will be operated, by means of a connection 205 extending forwardly and having a knob 206 extending through the base convenient to the operator. The shaft 203 is operated every time the main shaft 52 is operated by means of a lever 207 extending from said shaft through an opening in the base and carrying a pawl 208 operating on a ratchet wheel 209 on the shaft 203. Thus the ribbon is moved whenever the adding department is operated.

The ribbon is operated by the writing department keys by means of a link 210 leading from one of the arms 184 to a bell crank 211 one arm of which extends through the base and is pivoted to a longitudinal member 212 and carrying pawls 213 which operate on a ratchet wheel 214 on the shaft 203 and thereby rotate this latter whenever the arms 184 are drawn down by operation of one of the writing keys. The spacing key 215 has projections extending through the base of the machine and connected to arms 216 on a rod 217 which also carries a vertical arm 218 to which the front end of the member 212 is connected. Thus the platen can be operated across the machine by the key 215 which operates the shaft 181 and the escapement in the same manner as one of the writing keys.

The platen is turned a short distance after every arithmetical item is entered by means of the following devices. An arm 219 (see Figs. 5 and 7) is rigid with one end of the shaft 85 which is rotated by the link 93 as described. A link 220 connects the arm 219 with a lever 221 pivoted to one of the inner frames 18 and in the upper end of which a notch 222 is formed. A rod 223 is carried by two arms 224 pivoted to the platen shaft said lever 221 and the arms 224 will be operated whenever the shaft 85 is turned. One of the arms 225 is connected by a link 226 to a lever 227 pivoted to the platen frame and carrying a pawl 228 (see Fig. 3) which operates on a ratchet wheel 229 rigid on the platen shaft. Hence when these parts are operated the pawl 228 will be advanced to another tooth on the ratchet wheel 229 and the restoration of the parts will turn the platen a space, or equal to one tooth on the controlling ratchet 229.

I claim—

1. The combination of the type-carriers, racks controlling said carriers, devices for operating said type-carriers and racks in recording operations, a transversely movable carriage, parts adjusted by the movement of said carriage to limit the movement of said type-carriers and racks, and means for moving the type-carriers and racks independently a certain distance to record certain figures, substantially as specified.

2. The combination of the type-carriers, racks controlling said type-carriers, a carriage, stops for limiting movement of the racks and type-carriers, means for moving said carriage effectively to set said stops in position to limit the movement of said type-carriers and racks, adding wheels, means for causing said racks to operate said adding wheels effectively to transfer from lower to higher orders in said wheels, and carrying levers arranged to aline the adding wheels and racks in their idle positions, substantially as specified.

3. In an adding machine, type-carriers, a carriage, racks in connection with said type-carriers, stops for limiting the movement of said type-carriers and racks, means for causing said carriage to set said stops in position to limit movement of said type-carriers and racks, means for operating said type-carriers and racks, adding wheels, pivoted elements arranged to aline the adding wheels and racks in idle adjustments, and means for operating said racks effectively to transfer from lower to higher orders in said adding wheels, substantially as specified.

4. In an adding machine, a platen, an inking ribbon, a portion of the platen adjacent to the ribbon being visible to the operator, a series of type-carriers each of which carries a series of type, means for moving said type-carriers to position the type adjacent to the writing line of the platen to represent numbers, means for causing the type to record on the platen the numbers as represented while the type-carriers remain stationary, and automatic means for rotating the platen a distance sufficient to bring the numbers so recorded into view of the operator.

5. In an adding machine, a platen, a portion thereof being visible to the operator, an inking ribbon held close to the visible portion of the platen, relatively movable type-carriers arranged side by side, each thereof being provided with a series of type, means for moving said type-carriers to position the type adjacent to the writing line of the platen to represent numbers, means for causing the type to record on the platen the numbers so represented while the type-carriers remain stationary, and automatic means for moving the ribbon and the surface of the platen relatively to render the number so recorded visible to the operator.

6. In an adding machine, a platen, recording devices operable to record numbers on the platen, a carriage whose operation is necessary before said recording devices may be operated, adding wheels operated by the recording devices, stop-pawls holding both the recording devices and adding wheels in idle position, and means whereby said adding wheels will operate the stop-pawls whenever it is necessary to carry, substantially as specified.

7. In a recording machine, in combination, a laterally movable platen arranged to carry paper, mechanism operable to record words on paper carried by the platen, and mechanism independent of the word-recording mechanism operable to record numbers on the paper carried by said platen, said last-named mechanism comprising a series of movable type-carriers arranged side by side, type on said type-carriers, a series of movable pins arranged in parallel rows, a series of keys, key levers controlled by the keys, a laterally movable carriage controlled by the keys and operable in connection with the key levers to position the said pins to represent numbers, mechanism operable in connection with said pins and the type-carriers to position the type to represent the same numbers represented by said pins, and means for printing said numbers by use of the type, substantially as described.

8. In an adding machine, type-carriers, racks connected to said type-carriers, means for moving said type-carriers and racks relatively, a movable carriage, stops adjustable by said carriage in position to limit movement of the type-carriers and racks, printing hammers operable to drive the type on said type-carriers to print, and adding mechanism operated by the racks, substantially as specified.

9. In an adding machine, type-carriers, a carriage, a movable device preventing operation of said type-carriers when said carriage is in idle position, means for setting up numbers in said carriage, an escapement device for moving said carriage, means for operating said type-carriers to record the numbers set up in said carriage, adding mechanism for adding said numbers, means for restoring said carriage to idle position incidentally to the adding of the numbers, and means for moving said device which prevents operation of said type-carriers, so that totals in said adding mechanism may be recorded, while said carriage is in its idle position, substantially as described.

10. In an adding machine, a series of arcuate type-carriers, type on said carriers, a platen arranged to feed paper to said type-carriers, a carriage whose operation is necessary before said type-carriers may be actuated, mechanism for actuating said type-carriers toward said platen, hammers, and means controlled by said type-carriers for determining which of said hammers shall be operated.

11. In a machine of the character described, a series of pivoted sectors, type carried by said sectors, said type having their printing faces inside the arcs of the sectors and being movable inwardly, a visible platen located within the arcs of said sectors, mechanism for operating said sectors to record on said platen, drivers arranged to drive said type toward said platen effectively to print on paper on said platen, adding mechanism, and devices for operating said adding mechanism when said sectors move, substantially as specified.

12. In an apparatus of the class mentioned, a platen, writing type-bars arranged in two groups with an intervening space, and adapted to strike the front of the platen, an adding department having type-carriers, and devices for moving said type-carriers into said space to record on the front of the platen, substantially as specified.

13. The combination of the platen, writing department type-bars arranged in two groups, one at each side of the machine with an intervening space, with the adding department having type-carriers adapted to operate into said space, means for operating said type-bars and type-carriers to print on the front side of the platen, and adding mechanism operated incidentally to the operation of said type-carriers, substantially as specified.

14. The combination of a platen, writing department type-bars mounted in two groups, one at each side of the machine with an intervening space, and means for striking the type-bars therein to record on the front side of the platen, with type-carriers of the adding department, and means for operating said type-carriers into said space to print on the front side of the platen in alinement with the written record, substantially as specified.

15. The combination of the type-carriers, separately movable gear attachments controlling them, a carriage, stops in said carriage, and devices for moving the gear attachments and the carriage and stops relatively so that the gear attachments will engage the stops to limit movement of the type-carriers, substantially as specified.

16. The combination of the platen arranged to hold paper, devices for recording numbers thereon, separately movable members to control said devices, adding wheels operable by said devices, a carriage having stops therein, and means for moving the carriage and stops to engage the devices which move to limit throw thereof, substantially as specified.

17. The combination of the platen, and the type-bars of the writing department mounted in groups at the sides of the machine to provide a central space in which the platen is visible, said type-bars being operable to write in said visible space, with the type-carriers of the adding department below the platen, and devices for moving them into said space to record across the printing point of the writing type-bars, and in alinement with the written record, substantially as specified.

18. In an adding and writing machine, type-carriers for printing numbers, separately movable gear attachments controlling said type-carriers, adding wheels operated by said gear attachments, and a movable carriage having stops therein to limit throw of the gear attachments, in combination with mechanism operable to print any desired words in juxtaposition to the numbers, substantially as specified.

19. In an adding machine, a platen having a printing surface in view of the operator, recording mechanism operable to print numbers on the visible surface of the platen, racks associated with said recording mechanism, adding wheels operated by said racks, stop pawls in engagement with said racks and said adding wheels in idle position of said wheels, and means whereby the adding wheels will operate the stop pawls whenever it is necessary to carry, substantially as specified.

20. In an adding machine, a platen, a ribbon in front of the same but below the printing line, type-carriers below the platen, means for moving them in front of the platen, and means controlled by the type-carriers for raising the ribbon to the printing line when the type-carriers are operated, substantially as specified.

21. In an adding machine, a carriage, movable pins in said carriage, a series of numeral keys operable to set said pins to represent numbers, means for moving said carriage when said keys are operated, a pivoted correction key located close to said numeral keys, connections whereby operation of said correction key will move said carriage to idle position, from whatever position it may be in, after said numeral keys have been operated, and means for causing said pins to return to their idle positions in said carriage when said carriage moves toward its idle position, substantially as specified.

22. In an adding machine, recording devices, a carriage, a series of stops, means for moving the carriage effectively to set said stops to limit movement of the recording devices, adding mechanism controlled by the recording devices, and alinement pawls common to the recording devices and adding mechanism, said pawls engaging with and holding said recording mechanism in idle position, substantially as specified.

23. In an adding machine, a shaft, type-carriers pivoted on said shaft, a carriage, keys operable to set up numbers in said carriage, an escapement device controlling movement of said carriage, mechanism for operating said type-carriers, movable elements intermediate said carriage and said type-carriers limiting movement of said type-carriers, and adding mechanism operated by said movable elements, substantially as specified.

24. An adding and writing machine having the type-bars 161 on vertical spindles and arranged in two groups, one at each side of the machine, to provide an intervening space, a platen, means for operating the type-bars to strike the front of the platen, devices for printing arithmetical records also on the front of the platen, and adding mechanism operated by said devices, substantially as specified.

25. In an adding and writing machine, type-bars arranged in two groups to leave a central space, operating devices for said type-bars, a platen, type-carriers, and means for operating the type-carriers, to print in the same line with the writing type-bars on the front side of the platen, substantially as specified.

26. In an adding and writing machine, a platen, type-bars 161 mounted on vertical spindles, key-levers, bell-cranks pivoted above said key-levers and connected therewith by links, and also connected with the type-bars whereby the latter will be swung horizontally to strike a common center on the front side of the platen, springs for restoring said parts to position after operation, and independent devices for writing numbers, substantially as specified.

27. In a writing machine, a platen, a frame mounted vertically at each side of the machine in front of the platen, spindles supported in said frames, type-bars carried by said spindles, key-levers, bell-cranks interposed between said key-levers and the type-bars, whereby the latter may be operated to strike the front of the platen, springs for restoring said parts to idle position after operation, and independent devices between said type-bars for writing numbers, substantially as specified.

28. In an adding machine a platen, arranged to hold paper, a shaft, arcuate type-carriers pivotally supported by the said shaft, type on said type-carriers having their printing faces inside the arcs of said type-carriers, mechanism whereby said type-carriers may be operated to a position embracing said platen within the arcs of said type-carriers and to aline any desired type adjacent to the printing line on said platen, and type driving elements operated effectively to drive the said alined type after said type-carriers have been positioned, as aforesaid, as required to cause said type-carriers to record on paper on said platen, substantially as specified.

29. In an adding and writing machine, a platen, type-carriers operable effectively to record numbers on said platen, adding mechanism operable incidentally to the operation of said type-carriers effectively to add the numbers recorded, type-bars, and means for operating said type-bars across the line of movement of said type-carriers effectively to record in the space wherein said type-carriers would record if operated, substantially as specified.

30. In an adding machine, type-carriers, racks movable with said type-carriers, a carriage whose operation is necessary before said type-carriers may be operated, means for moving the type-carriers a certain distance before moving the racks, adding wheels operated by said racks, elements common to said racks and adding wheels effective to hold said racks and wheels in their idle adjustments, and means for causing said racks to transfer from lower to higher orders between said adding wheels, substantially as specified.

31. In an adding machine, racks, type-carriers in connection with said racks, a carriage whose operation is necessary before said racks and type-carriers may be operated, mechanism for operating said type-carriers and racks, adding mechanism operated by said racks, movable elements limiting backward movement of said racks, trips operated by said adding mechanism for moving said movable elements effectively to release said racks, and means for operating said racks effectively to transfer or carry from lower to higher orders in said adding mechanism, substantially as specified.

32. In an adding machine, a series of type-carriers, a series of stops for each type-carrier, a carriage operable to set said stops in position to represent numbers, mechanism for operating said type-carriers effectively to record the numbers represented by said stops, adding mechanism operated as an incident to the recording of numbers effectively to add the numbers recorded, and mechanism whereby said adding mechanism and said type-carriers may be caused to coöperate effectively to record the total represented in said adding mechanism while said carriage remains in its idle position, substantially as specified.

33. In an adding machine, a carriage, means for setting up numbers in said carriage, recording mechanism operable to record said numbers, adding mechanism operable effectively to add the numbers recorded, and mechanism coöperating said adding mechanism and said recording mechanism whereby said adding and recording mechanisms may be coöperatively operated effectively to record the total represented in said adding mechanism while said carriage remains in its idle position, substantially as specified.

34. The combination in an adding machine, of a series of key controlled stops, a laterally-movable carriage for moving said stops, spring actuated racks adapted to engage with said stops, and type-carriers controlled by said racks and having independent movement in order to record "0" while said racks remain stationary, substantially as specified.

35. In an adding machine, a series of type-carriers, a carriage whose operation is necessary before said type-carriers may be operated, adding mechanism operated incidentally to the operation of said type-carriers, and appliances whereby said type-carriers may be operated effectively to record any number or total represented in said adding mechanism, while said carriage remains in its idle position, substantially as specified.

36. In an adding machine, the combination with a carriage, type-carriers coöperating with said carriage, an element arranged to hold said type-carriers in their idle positions, means for moving said element to release said type-carriers incidentally to the operation of said carriage, and adding mechanism controlled by said type-carriers, of means for releasing said element from said type-carriers while said carriage is in its idle position, substantially as specified.

37. In an adding machine, a platen having the printing field visible, type-carriers located below the platen, and devices for moving said type-carriers to record on the visible printing field on the platen, in combination with printing devices located at each side of said type-carriers, and means for operating said type-carriers to record on the visible field of the platen in line with the records produced by said type-carriers, substantially as specified.

38. The combination of a series of stops, keys for setting said stops to represent numbers, means for resetting said keys in idle position while said stops remain set in the position to which they are moved by said keys, type-carriers operable to record the number represented by said stops, hammers for driving the type to record, a latch for each hammer, bars for releasing said latches, devices actuated by said type-carriers effectively to move said bars, and means for moving said bars effectively to release said latches when said type-carriers are operated substantially as specified.

39. In an adding machine, a series of type-carriers, an element arranged to prevent operation of said type-carriers, a carriage, means for operating said carriage effectively to release said element and permit said type-carriers to be operated, adding mechanism, and appliances operable to release said element and cause coöperation of said adding mechanism and said type-carriers to record the total represented in said adding mechanism while said carriage remains in its idle position, substantially as specified.

40. In an adding machine, recording devices comprising two relatively movable parts, type mounted on one of said parts, actuating devices operable to move said type-carrying part to position to record "0" prior to any movement of the other part, means for moving both parts together to record the remaining numerals, and a carriage whose operation is necessary before said parts may be operated, substantially as specified.

41. In an adding machine, a series of type-carriers, a series of hammers, a carriage whose operation is necessary before said type-carriers may be operated, means for operating said type-carriers, and means for operating the same number of hammers as there are type-carriers which operate at each operation of said type carriers, substantially as specified.

42. In an adding machine, a series of type-carriers, a series of hammers arranged to coöperate with said type-carriers to produce records, and a carriage whose operation is necessary before said hammers and type-carriers may be operated, substantially as specified.

43. In an adding and writing machine, the combination of a platen, typewriting mechanism operable to record on paper on said platen, type-carriers separate from said typewriting mechanism, a carriage whose operation is necessary before said type-carriers may be operated, and mechanism for operating said type-carriers effectively to record on paper on said platen, substantially as specified.

44. In an adding machine, the combination of a transversely movable carriage, stops in the carriage arranged to be set in operative position by depression of the numeral keys, a platen arranged to hold paper so that the writing line will be visible to the operator, and ten numeral keys located and arranged in two transverse rows in front of and parallel with said platen in such position and relation to each other as to permit the five digits of a single hand of the operator facing said rows and said platen to be positioned to operate all of the keys by placing the thumb to rest upon and operate the key at the extreme edge of the lower row of the bank of keys, the fore finger of the same hand to operate the first and second keys of the upper row and the second key of the lower row and each of the succeeding fingers to operate two of the succeeding keys by a backward and downward movement from the upper to the lower row whereby the keys may be operated by the fingers without observation, substantially as specified.

45. In an adding machine, the combination of a transversely movable carriage, stops in said carriage arranged to be set in operative position by the depression of the numeral keys, a platen arranged to hold paper so that the writing line will be visible to the operator, and ten numeral keys for setting said stops located and arranged in such position and relation to each other as to permit the five digits of a single hand of the operator facing said row and said platen to be positioned to operate all of the keys by placing the thumb to rest upon and operate the key on one extreme edge of the bank of keys, the fore finger of the same hand to operate a plurality of the succeeding keys and each of the succeeding fingers to operate two of the succeeding keys, whereby the keys may may be operated by the fingers independent of observation, substantially as specified.

46. In an adding and writing machine, a paper carriage, and typewriting mechanism operable to record on paper in said carriage, in combination with a series of type carriers separate from said typewriting mechanism, a carriage whose operation is necessary before said type-carriers may be operated, operating mechanism whereby the type-carriers may be moved to position for printing on paper in said paper carriage, and devices for printing on paper in said carriage when the type-carriers are operated as aforesaid, substantially as specified.

47. In an adding and writing machine, a platen, typewriting type-bars arranged in two groups and at the sides of the machine in front of the platen, there being a space between said type-bars, a ribbon, ribbon guides supporting said ribbon below the writing line on the platen, devices for raising the ribbon on the writing line when said type-bars are operated, type-carriers below the platen, means for operating them into the space between said type-bars in front of the platen, means for raising the ribbon guides to place the ribbon on the writing line when said type-carriers are operated, and means for producing a record incidentally to the operation of said type-carriers, substantially as described.

48. In an adding machine, arcuate type-carriers having type with their printing faces inward, a platen having a visible printing surface located within the arcs of said type-carriers, devices for operating said type-carriers and type to print on the visible surface of the platen, and typewriting mechanism operable to print any desired words on the front surface of the said platen, substantially as specified.

49. In an adding and writing machine, a platen having a visible printing surface, type-bars arranged in two groups with an intervening space, and keys whereby said type-bars may be caused to record on the visible portion of said platen, in combination with adding mechanism type, and mechanism for operating said type into said space and causing said type to record numbers on the visible surface of the platen in alinement with the written record, substantially as specified.

50. The combination with a typewriting mechanism, and adding and recording mechanism, keys for said typewriting mechanism arranged in a key board, and keys whose operation is necessary before said adding and recording mechanism may be operated arranged close to the said keys for the typewriting mechanism, of a paper carriage, a roller or platen thereon arranged to feed a sheet of paper to both mechanisms, a single ribbon serving both mechanisms, means for feeding said ribbon operated by either mechanism, manually-operated mechanism for rotating said roller or platen, and automatic means for rotating said roller or platen at the end of each line of printing, substantially as specified.

51. The combination with a typewriting mechanism, an adding mechanism, keys whose operation is necessary before said adding mechanism may be operated, means for moving said keys to idle position after each operation thereof and before operation of the adding mechanism and mechanism for operating said adding mechanism while said keys remain in idle position after being operated as aforesaid, of a paper carriage, a roller or platen thereon arranged to feed a sheet of paper to both mechanisms, and means for rotating said roller or platen operated by a part of the adding mechanism, substantially as specified.

52. The combination with a typewriting mechanism, an adding mechanism, and a series of ten keys for limiting said adding mechanism in all its adding operations, of a paper carriage, a roller or platen thereon arranged to feed a sheet of paper to both mechanisms, and means for rotating the roller or platen operated by a part of the adding mechanism, or manually, as desired.

53. The combination with a typewriting mechanism, an adding mechanism, and a series of ten keys for limiting said adding mechanism in all its adding operations, of a paper carriage, a roller or platen thereon arranged to feed a sheet of paper to both mechanisms, manually-operated mechanism for rotating said roller or platen, and automatic means for rotating said roller or platen at the end of each line of printing, substantially as specified.

54. In an adding and writing machine, typewriting mechanism, a platen, type-carriers, a carriage whose operation is necessary before said type-carriers may be operated, and mechanism for operating said typewriting mechanism and said type-carriers effectively to produce joint typewritten and arithmetical records on paper on said platen, substantially as specified.

55. In an adding and writing machine, a platen arranged to hold paper, typewriting mechanism operable to record words on said paper, type-carriers operable to record numbers on said paper, a carriage whose operation is necessary before said type-carriers may be operated in certain adding operations, and adding mechanism controlled by said type-carriers to add the numbers recorded thereby, substantially as specified.

56. In an adding and writing machine, the combination of a platen arranged to hold paper, typewriting mechanism operable to record on said paper, type-carriers separate from said typewriting mechanism, a carriage whose operation is necessary before said type-carriers may be operated, keys controlling said carriage, and means for operating said type-carriers permitted by said carriage to operate to record numbers on said paper, substantially as described.

57. In an adding and writing machine, a platen arranged to hold the paper, typewriting mechanism operable to record on said paper, adding and recording mechanisms operable to record numbers on said paper and incidentally to add said numbers, and a carriage whose operation is necessary before said adding and recording mechanism may be operated, substantially as described.

58. In an adding machine, a platen arranged to hold paper, type-carriers, a carriage whose operation is necessary before said type-carriers may be operated and determining to what extend said type-carriers may be operated, mechanism for operating said type-carriers, hammers, and means for causing said hammers to drive the type effectively to record on the paper on said platen, in combination with automatic means for rotating said platen at the end of each line of printing, substantially as described.

59. An adding and writing machine consisting of two vertical outer frames, two vertical frames 18 between the outer frames, recording devices and an adding mechanism therefor, all between the two inner frames 18, a series of key-levers supported between the inner frames 18 and the outer frames and entirely outside the former, type-bars operable by the keys, and a common platen for the recording devices and type-bars, the matter printed on the platen being visible to the operator after the parts operated move back to normal position, substantially as specified.

60. The combination with a platen arranged to hold paper, and an ink ribbon supported so that the paper passes between said ribbon and said platen, of a series of type-carriers, a series of type on each carrier, a carriage whose operation is necessary before said type-carriers may be operated, means for operating said type-carriers to aline any desired type adjusted to said ribbon and platen, a series of type driving hammers, and means for causing said hammers to drive the alined type against said ribbon effectively to produce records on said paper, substantially as specified.

61. In an adding machine, the combination with a platen arranged to hold paper, an ink ribbon supported adjacent to said platen so that the paper will be between said ribbon and said platen, of series of type, a carriage whose operation is necessary before said type may be employed to print, mechanism for operating any desired type to alined position adjacent to said ribbon and platen, hammers operable to drive alined type against said ribbon to print, and automatic means for rotating the platen to feed paper in line spacing, substantially as described.

62. In an adding machine, the combination with a laterally-movable paper carriage, recording mechanism operable to record on paper in said carriage, a carriage whose operation is necessary before said recording mechanism may be operated, automatic means for rotating said platen in line spacing, and means for preventing rotation of said platen, substantially as specified.

63. In an adding machine, series of type, hammers operable to drive said type in printing operations, devices holding each hammer until the proper time to operate, a carriage whose operation is necessary before said hammers shall be operated, and means for releasing said holding devices when the time for operation of said hammers arrives, substantially as specified.

64. Recording mechanism comprising a series of type-carriers, type mounted on said type-carriers, hammers operable to drive said type to print, a carriage whose operation is necessary before said hammers may be operated, and means for operating said hammers, substantially as described.

65. In an adding machine, a carriage, movable parts in said carriage, means for adjusting said parts to represent numbers, a member mounted above said carriage, and means for moving said carriage in said member so that the movable parts in the carriage which had been adjusted to represent numbers will contact with and be restored to idle position by said member, substantially as specified.

66. In an adding machine, type-carriers, hammers, devices for holding said hammers, a shaft, means operated by said shaft to release said hammers, means for operating said hammers effectively to drive the type on said type-carriers to print, and a carriage determining which of said hammers may be released, substantially as described.

67. In an adding machine, a series of type-carriers, type carried by said type-carriers, hammers operable to drive said type to record, means for operating said hammers, a carriage whose operation is necessary before said hammers may be operated, and adding mechanism operated incidentally to the operation of said type-carriers, substantially as specified.

68. In an adding machine, a series of type-carriers operable to record numbers, a carriage whose operation is necessary before said type-carriers may be operated, a series of hammers operable to drive the type to record, means for operating one hammer for each type-carrier which may be operated, and means for preventing operation of the remaining hammers, substantially as described.

69. In an adding machine, a carriage, movable parts in said carriage, means for adjusting said movable parts, a key operable to move said carriage to idle position, and a member arranged to contact with said movable parts, and to restore them to their normal positions when said carriage is moved by said key, substantially as specified.

70. In an adding machine, the combination of the type-carriers, separately movable controlling members connected to said type-carriers, a carriage movable transversely of the travel of the type-carriers and controlling members, means for operating said type-carriers and said controlling members, a row of stops for each of said controlling members, and means for moving said carriage effectively to set any selected stops in position to limit movement of said type-carriers and controlling members, substantially as described.

71. In an adding machine, the combination of the type-carriers, separately movable controlling members connected to said type-carriers, adding mechanism operated by said controlling members, and a carriage movable transversely relative to the movement of said controlling members and adapted to limit the movement of said controlling members and of said type-carriers, substantially as specified.

72. In an adding machine, the combination of the type-carriers, a carriage, stops in said cariage, devices for moving the type-carriers and the carriage and the stops relatively so that the movement of the type-carriers will be limited by said stops, means for operating said type-carriers, a platen arranged to hold paper, and devices for printing on said paper when said type-carriers are operated, substantially as specified.

73. The combination of a platen arranged to carry paper, type-carriers, type mounted on said type-carriers, hammers, a carriage, means for moving said carriage, means positioned by said carriage to limit movement of said type-carriers, means for operating said type-carriers, and means for causing said hammers to drive said type to record on paper on the platen, substantially as described.

74. The combination in an adding machine, of the type-carriers, type mounted on said type-carriers, a platen arranged to hold paper, a carriage, elements positioned by operation of said carriage to limit movement of said type-carriers, means for operating said carriage, means for moving said type-carriers, and means operated automatically to drive the type as required to print on paper on said platen, substantially as specified.

75. In an adding machine, type-carriers, a carriage, means for moving said carriage, and stops for said type-carriers positioned by operation of said carriage, in combination with a platen arranged to hold paper, and devices coöperative with said type-carriers effectively to record on said paper when said type-carriers are operated, substantially as described.

76. In an adding machine, a series of type-carriers, a series of hammers arranged to coöperate with said type-carriers to record, means holding said hammers, means for releasing said hammers, and a carriage whose operation is necessary before said hammers are released, substantially as specified.

77. The combination in an adding and writing machine, of type-carriers for the adding department, a carriage, stops within the carriage, devices for moving the type-carriers and the carriage and stops relatively, so that the movement of the type-carriers will be limited by the stops, a platen, and means for printing thereon from the type-carriers, type for written records, and devices for operating said type to write upon the platen to produce joint records with the type carriers of the adding department, substantially as specified.

78. In an adding and writing machine, including a platen, recording devices for the adding department, a carriage, stops controlled by said carriage, devices for setting the stops, means for moving the carriage and thereby the stops, and the recording devices relatively, so that the movement of the latter will be limited by the stops which had been set, a platen holding paper to receive the records, and means for causing said recording devices to print on said paper, in combination with devices for producing written records upon the same paper on said platen with the records produced by said recording devices, substantially as described.

79. An adding and writing machine, consisting of a platen arranged to hold paper, recording devices operable to produce arithmetical records on the paper on said platen, a carriage, stops, means for moving the carriage effectively to set said stops in position so that the recording devices may engage the stops which had been set by said carriage, means for causing said recording devices to print on paper on said platen, type-carriers for producing written records, and means for operating the same to write upon the platen, substantially as specified.

80. An adding machine comprising, type-carriers, separately movable members for controlling the type-carriers, a carriage, stops therein, devices for moving the carriage adjacent to the movable controlling members, devices for moving the type-carriers and their controlling members when a number is to be recorded, and means for pre-arranging the stops in the carriage so that such of the controlling members as move will engage therewith to limit movement of the type-carriers and thereby record the required number, substantially as specified.

81. In an adding machine, a carriage, means for setting up numbers in said carriage, type-carriers operable to record said numbers, an element preventing operation of all type-carriers whose operation is not necessary in the recording operations, adding mechanism operable to add the numbers recorded, and means whereby said adding mechanism and said type-carriers may be coöperated while said carriage remains in its idle position, effectively to record any number or total represented in said adding mechanism, substantially as specified.

82. In an adding machine, a carriage, stops in said carriage, means for setting said stops to represent numbers, means for moving said carriage, mechanism operable to record said numbers, means for moving said carriage to its idle position, and an element mounted above said carriage arranged to engage with and restore said stops to idle position incidentally to the movement of said carriage to its idle position, substantially as specified.

83. An adding and writing machine comprising a platen arranged to hold paper, type-carriers for the adding department, a carriage, stops in said carriage adapted to be set to limit movement of the type-carriers, and means for moving the carriage and thereby the stops and the type-carriers relatively so that movement of the type-carriers will be limited by the stops which have been set, in combination with the type-carriers of the writing department, and keys for operating said last-named type-carriers to record on said paper in alinement with the records of the adding department, substantially as specified.

84. In an adding machine, a platen arranged to carry paper, type-carriers, a carriage, stops in said carriage, keys operable the type-carriers so that the type-carriers type-carriers to the front of the platen, and means for moving the carriage relative to the type-carriers so that the type-carriers which move will be stopped by the stops which had been set by the keys, substantially as specified.

85. In an adding machine, a platen having a printing field exposed to view, type-carriers, type supported by said type-carriers, mechanism for moving said type-carriers toward and away from said platen, means for holding said type-carriers stationary adjacent to said platen, hammers operable to drive said type to record while said type-carriers are stationary, a ribbon, ribbon guides holding said ribbon, means for causing said guides to move the ribbon to and from said visible printing field, and adding mechanism operable automatically to add numbers recorded, substantially as specified.

86. In an adding machine, a platen having its front side exposed to view, arcuate type-carriers below said platen, devices for moving said type-carriers in front of said platen, a carriage, stops in said carriage, keys to set said stops, and devices for moving said carriage and stops into position to limit the movement of said type-carriers, substantially as specified.

87. The combination of the type-carriers, separately movable racks connected with said type-carriers, a movable carriage, stops in said carriage, devices for moving said carriage and thereby the stops relative to said racks, so that movement of the latter will be limited by said stops, a platen arranged to carry paper, and means for printing on said paper when the said parts are operated, as aforesaid, substantially as specified.

88. In an adding machine, type-carriers, racks connected with said type-carriers, means for moving said type-carriers and racks, a carriage, stops in said carriage, keys operable to set said stops to represent numbers, devices for moving said carriage and stops into position to limit movement of said type-carriers and racks, adding mechanism operated by said racks, and a platen arranged to hold the paper to receive the numbers indicated by said type-carriers when operated, substantially as specified.

89. The combination of the recording mechanism, a carriage, stops in said carriage, means for moving said carriage and stops to limit the movement of the recording mechanism, adding wheels operated by said recording mechanism, and carrying levers connecting with and alining the recording mechanism and the adding wheels when no numbers are represented in the latter and the machine is idle, substantially as specified.

90. An adding machine comprising a laterally-movable platen arranged to hold paper, means for moving said platen laterally, of series of type-carriers, a carriage whose operation is necessary before said type-carriers may be operated, mechanism for printing on paper on said platen when said type-carriers are operated, and automatic means for rotating said platen after each record is made in whatever position said platen may be, substantially as specified.

91. In an adding and writing machine, a platen arranged to hold paper, type-bars arranged with an intervening space midway of the sides of the machine, and means for operating said type-bars to print on the front side of the platen, in combination with adding mechanism type, and means for operating said type into said space to record on the front side of the platen, said matter being visible to the operator after it is written, substantially as specified.

92. In an adding and writing machine, a platen arranged to hold paper, type-bars operable to record on the front of the platen, type-carriers for arithmetical records located out of the path of movement of said type-bars so that the latter may have free movement, means for positioning said type-carriers for printing, and hammers operable to drive the type on said type-carriers to print after said type-carriers have been positioned, substantially as described.

93. An adding and writing machine comprising a platen, writing type-bars operable to record on the platen, type-carriers, devices for operating them to record on the platen, a carriage, stops for said type-carriers, and devices for causing said carriage to position said stops to limit movement of the type-carriers when they are operated to record, substantially as specified.

94. An apparatus of the class described, comprising a platen having a portion of its front side visible to the operator, devices for recording words and numbers at the same printing point midway of the sides of the machine on the visible surface of the platen, and devices for accumulating totals of the numbers so recorded, substantially as specified.

95. In an adding and writing machine, a platen having a portion of its front side visible to the operator, devices for recording words and numbers on the visible surface of the platen midway of the sides of the machine, means for writing numbers on said visible surface midway of the sides of the machine, and adding mechanism to add the numbers as they are recorded, substantially as specified.

96. An adding and writing machine comprising a platen having that portion of its front surface midway of the sides of the machine visible to the operator, devices for producing written and arithmetical records either independently or as joint results at the same printing point on the visible surface of the platen, and adding mechanism operable to add the arithmetical items as they are recorded, substantially as specified.

97. An apparatus for producing written and arithmetical records, comprising a platen, type-bars mounted on spindles and movable horizontally to strike the front surface of the platen, means for recording numbers on the front surface of the platen at the point of contact of the type-bars, and means for accumulating totals of the numbers as they are recorded, substantially as specified.

98. An apparatus for writing and adding purposes comprising a platen, a support adjacent thereto, substantially vertical rods or spindles in said support, U-shaped type-bars of graduated lengths mounted to said rods and movable substantially horizontally to strike a common printing point on the front of the platen, and means for recording arithmetical records on the front of the platen and accumulating the totals thereof as the various items are recorded, substantially as specified.

99. An adding and writing machine consisting of a platen, two groups of horizontally movable type-bars mounted in front of the platen with an intervening space wherein the platen is visible, devices for operating the type-bars to write in said visible space, devices for recording numbers in said space in alinement with the written records, and means for accumulating the total as the various numbers are recorded, substantially as specified.

100. An apparatus for writing and adding purposes comprising a platen, two groups of substantially horizontally movable type-bars mounted in front of the platen with an intervening space wherein the platen is visible, means for operating the type-bars to write in said visible space, and means for recording numbers in said visible space on the same point struck by the operation of the type-bars and at the same time accumulating the total of the numbers so recorded, substantially as specified.

101. An apparatus for writing and adding purposes comprising a platen having its front surface midway of the sides of the machine visible to the operator, mechanism for recording words and numbers at the same printing point on the visible surface of the platen midway of the sides of the machine, and mechanism for adding together the numbers so recorded, substantially as specified.

102. In an adding machine, a movable platen, type-carriers, a carriage, stops within the carriage, devices for moving the carriage and stops and the type-carriers, means for limiting movement of the type-carriers by the stops, and devices for printing on the platen by means of the type in the carriers, substantially as specified.

103. The combination of arcuate carriers, movable type carried by the carriers and having their faces inside the arcs thereof, devices for driving the type, a platen to receive the records, a movable carriage, stops for said carriers, and devices for causing the carriage to position said stops to limit movement of the carriers, substantially as specified.

104. The combination of the platen having one side visible to the operator, arcuate carriers, movable type carried by the carriers and having their faces inside the arcs thereof, mechanism for moving the carriers to the visible surface of the platen, devices for driving the type, a movable carriage, stops for the carriers, and mechanism for moving the carriage and stops to limit movement of the carriers, substantially as specified.

105. In an adding and writing machine, a platen having one side visible to the operator, type-carriers operable to record arithmetical items on the visible surface of the platen, a movable carriage, stops for said type-carriers, and means for causing said carriage to position said stops to limit throw of the type-carriers, in combination with mechanism operable to print any desired words on the visible surface of the platen.

106. The combination of a platen having one side visible to the operator, mechanism operable to print any desired words on the visible surface of the platen, mechanism operable to print numbers on the visible surface of the platen, a carriage, stops for said numbers printing devices, means for moving the carriage effectively to set any selected stops to limit movement of the numbers printing devices, and devices for accumulating the total of the numbers recorded, substantially as specified.

107. The combination of the platen arranged to carry paper, type-carriers, a carriage having projections, devices for moving the type-carriers and the carriage relatively so that the movement of type-carriers will be limited by the projections, and means for printing on the paper against said platen after movement of the carriers is stopped, substantially as specified.

108. The combination of the platen, devices for printing any desired words, devices for printing numbers, a carriage, means for moving said carriage, and means whereby the last-named printing devices may be positioned for printing the required number after said carriage is moved, substantially as set forth.

109. Recording mechanism comprising a platen arranged to hold paper, type-carriers, numeral type mounted on said type-carriers, and hammers operable to drive said numeral type to print on paper on said platen, in combination with word printing mechanism operable to print across the same printing point on which the numbers were printing unless the platen be moved.

110. In an adding and writing machine, a platen, movable type-carriers, type carried by said type-carriers, hammers for driving said type to record on paper on said platen, and keys arranged in a key-board and operable to decide which of said type-carriers and hammers may be operated, in combination with type-bars separate from said type-carriers, and keys arranged in the same key-board with said first-named keys operable to cause said type-bars to print on paper on said platen.

111. The combination of the platen, typewriting mechanism operable to record any desired words on said platen, devices independent of the typewriting mechanism movable adjacent to said platen, type carried by said devices, hammers for driving said type against said platen while said devices are stationary, and two series of keys arranged in a single key-board, one of said series controlling said typewriting mechanism, and the other series being operable to decide which of said independent devices and hammers shall be operated.

112. In an adding machine, type-carriers, loosely mounted type on said carriers, hammers for driving said type to record while said type-carriers remain stationary, a paper carriage feeding paper to said type-carriers, typewriting mechanism superimposed above said type-carriers, and two series of keys arranged in a single key-board, one of said series controlling said typewriting mechanism, and the other series deciding the number of said type-carriers which shall be operated.

113. In an adding and writing machine, a platen, words printing mechanism, keys for operating said words printing mechanism effectively to print on paper on said platen, type-carriers separate from said words printing mechanism, type on said carriers, hammers for driving said type to print on paper on said platen, devices for drawing the hammers away from said type after printing has been effected, a series of numeral keys in front of said first-named keys, devices controlled by said numeral keys to decide the number of said type-carriers that may be operated, and means whereby said numeral keys will be returned to idle position after each operation before operation of said type-carriers, substantially as specified.

114. In an adding and writing machine, a platen, typewriting mechanism, keys for operating said mechanism to record on paper on said platen, a series of type-carriers separate from said typewriting mechanism, hammers coöperatively related to said type-carriers for driving the type to print, a series of keys whose operation is necessary before said type-carriers may be operated, and means for restoring each of said last-named keys to idle position after operation and before operation of said type-carriers, substantially as specified.

115. In an adding and writing machine, the combination with the word printing mechanism, and a platen arranged to feed paper to said mechanism, of devices carrying type independent of the word printing mechanism, a carriage whose operation is necessary before said devices may be operated, means for moving said devices toward said platen for printing a number, means for printing the number after said devices have been so moved, and adding mechanism operable to add the numbers printed as aforesaid.

116. In an adding and writing machine, the combination with words printing mechanism having a platen arranged to carry paper, of devices carrying type independent of the words printing mechanism, means for moving said devices toward the platen as required for printing thereon at the same printing point whereon the words printing mechanism operated, means for recording on said printing point after said devices have been moved, and adding mechanism operable to add the numbers so recorded, substantially as specified.

117. In an adding and writing machine, the combination with a platen arranged to carry paper, and typewriting mechanism operable to print on said paper, of devices carrying type independent of the typewriting mechanism, means for moving said devices toward the platen as required for printing numbers thereon at the same point whereon the typewriting mechanism operates, means for recording at said printing point by said type after the devices have been moved, adding mechanism operable to add the numbers recorded, and automatic means for rotating said platen, substantially as specified.

118. In an adding and writing machine, the combination with a platen arranged to carry paper, type-carriers, hammers, type mounted on said type-carriers, a carriage operable to permit any desired number of said type-carriers and hammers to be operated, mechanism for operating said type-carriers and hammers to record numbers on paper on said platen, and automatic means for adding the numbers recorded, substantially as specified.

119. In an adding machine, the combination with a platen arranged to carry paper, of a series of type, hammers operable to drive said type to record, a carriage operable to permit any selected number of said hammers and type to operate to print, and automatic means for rotating said platen, substantially as specified.

120. An adding and writing machine, comprising a platen arranged to carry paper, devices for printing words on the front of the platen midway of the sides of the machine, devices for printing arithmetical records on the front of said platen, midway of the sides of the machine, all of said words and records being visible to the operator as printed, and adding mechanism operated by said arithmetical printing devices, substantially as specified.

121. In an adding and writing machine, a platen arranged to carry paper, type-bars, keys for operating said type-bars to print any desired words or numbers on said paper, separate numeral keys, mechanism operable to record numbers on said paper after said numeral keys are operated, adding mechanism arranged to add the numbers so recorded, and means for operating the numbers recording mechanism to print the totals at the same point on the paper that the numbers are recorded, unless the paper is moved, all of the said matter being printed on the front side of the platen midway of the sides of the machine, substantially as specified.

122. The combination with word printing mechanism having a platen arranged to carry paper, of type-carriers, means for operating said type-carriers to record on said paper, and a carriage whose operation is necessary before said type-carriers may be operated, substantially as specified.

123. The combination with a platen arranged to carry paper, and words printing mechanism operable to record on said paper, and recording mechanism separate from said words printing mechanism, a carriage whose operation is necessary before said recording mechanism may be operated, and means for operating said recording mechanism after said carriage has been operated, substantially as specified.

124. In a machine of the character described, words printing mechanism having a platen arranged to carry paper, adding mechanism, type-carriers separate from the words printing mechanism, a series of relatively movable type carried by each of said type-carriers, a carriage for alining any desired type on the type-carriers adjacent to the platen aforesaid, means for driving the type so alined against the said platen to print numbers, and means for operating the adding mechanism to add the numbers so printed, substantially as specified.

125. In a machine of the character described, a platen arranged to hold paper, type, means for driving said type to record on paper against said platen, a carriage whose operation is necessary before said type may be operated, means for moving said carriage, and stops setable by the carriage to limit movement of said type, substantially as specified.

126. In a machine of the character described, a platen arranged to carry paper, type-carriers, means for moving said type-carriers to record on the platen by means of the type, a row of stops for each type-carrier, a series of keys, means for positioning corresponding stops in different rows of stops by operation of each key, and means to engage the stops so positioned to limit movement of the type-carriers, substantially as specified.

127. In a machine of the character described, a platen arranged to carry paper, type-carriers, a row of stops for each type-carrier, a series of keys, each key being operable to position one stop in each row, means for moving the type-carriers to record on paper on said platen by use of the type, and means to engage the stops which had been positioned to limit movement of the type-carriers.

128. In a machine of the character described, a platen arranged to carry paper, type-carriers, a movable carriage, movable parts in the carriage, keys operable to move the said movable parts in the carriage, means for moving the type-carriers toward the platen to record thereon, and devices to limit movement of said type-carriers, substantially as specified.

129. In a machine of the character described, a type-writing mechanism having a platen arranged to carry paper, type-carriers separate from the typewriting mechanism, means for moving said type-carriers toward the platen to record, a row of stops for each type-carrier, a series of keys, means whereby each key may be operated to position a stop in each row of stops, means to engage the stops so positioned when the type-carriers move to limit movement of the latter, and means for recording on the platen aforesaid, after the type-carriers stop, substantially as specified.

130. In a machine of the character described, a platen arranged to carry paper, type-carriers, a row of stops for each type-carrier, a series of keys, parts movable by each key to position one stop in each row of stops, means for moving the type-carriers to record on the said platen, means to engage the stops which had been positioned to limit movement of the type-carriers, and typewriting mechanism operable to print any desired words on the platen aforesaid.

131. The combination with a platen arranged to hold paper, and mechanism operable to print words and numbers on the paper held by the platen, of type-carriers separate from the aforesaid mechanism, means for moving said type-carriers to record on paper held by the aforesaid platen, a carriage, means for moving the carriage, and devices intermediate of the carriage and type-carriers to limit movement of the latter, substantially as specified.

132. The combination of a platen arranged to hold paper, and mechanism operable to print words and numbers on paper held by the platen, of type-carriers separate from the aforesaid mechanism, means for moving said type-carriers toward the aforesaid platen, a carriage, means for moving the carriage, devices effective to limit movement of the type-carriers toward the platen after the carriage moves, and means to print on the paper held by the aforesaid platen.

133. The combination with typewriting mechanism having a platen arranged to hold paper, of type-carriers separate from the typewriting mechanism, means for moving said type-carriers toward the platen aforesaid, a carriage, a series of adjustable stops, means for moving the carriage to position the stops, parts to engage with the stops which are so positioned in order to limit movement of the type-carriers toward the platen, and means to drive the type as required to print on paper held by the said platen after the type-carriers moved toward the platen stop, substantially as specified.

134. In an adding machine, a carriage, pins in said carriage, keys for setting said pins to represent numbers, a spring for moving said carriage, mechanism for recording said numbers represented by said pins, and automatic means for restoring said carriage to idle position after each number has been recorded, substantially as specified.

135. In an adding machine, a carriage, pins in said carriage, keys for setting said pins to represent numbers, a spring for moving said carriage, mechanism for recording said numbers represented by said pins, means for operating said recording mechanism to record said numbers, automatic means for restoring said recording mechanism to idle position after recording any number, and means for restoring said carriage to idle position, substantially as specified.

136. The combination with a platen, and word printing mechanism for recording on said platen, of type-carriers separate from the word printing mechanism, a carriage, means for moving the type-carriers, and means to stop the type-carriers in position to record on the platen aforesaid, after the carriage has been moved.

137. In an adding and writing machine, word printing mechanism having a platen, a series of type-carriers separate from the word printing mechanism, means for moving the type-carriers toward said platen, a carriage, means to move said carriage, and stops set by operation of said carriage to stop the type-carriers in position to record on the said platen, substantially as specified.

138. An adding and writing machine comprising a typewriting mechanism having a platen, a series of type-carriers separate from the typewriting mechanism, means for moving said type-carriers toward said platen, a carriage, means to stop the type-carriers in position to record on said platen after said carriage has been moved, and recording elements operable automatically to record on said platen after said type-carriers stop as aforesaid.

139. The combination with the word printing mechanism having a platen, of type-carriers separate from the word printing mechanism, means for moving the type-carriers toward said platen, stops to limit movement of the type-carriers toward said platen, a carriage, means for moving said carriage effectively to position any desired stops as required to stop the type-carriers in recording position, hammers operable to drive the type on the type-carriers to record on the platen aforesaid, after the type-carriers stop, and adding mechanism operable to add any numbers recorded by said type-carriers, substantially as specified.

140. The combination with a series of type-carriers, hammers coöperating with the type on said type-carriers to record, and a carriage operable to select the number of said type-carriers which may be operated, of a paper carriage arranged to feed a sheet of paper to said type-carriers, and means for holding said carriage in different lateral adjustments to present different columns of the paper to said type-carriers.

141. The combination with a series of type-carriers, hammers coöperating with the type on said type-carriers to record, means for causing said hammers to operate incidentally to the operation of the corresponding type-carriers, each hammer remaining idle when the corresponding type-carrier is idle, and a carriage operable to select the number of type-carriers which may be operated, of a paper carriage arranged to feed a sheet of paper to said type-carriers, and means for holding said carriage in different lateral adjustments to present different columns of the paper to said type-carriers, substantially as specified.

142. In an adding machine, a series of type-carriers, a platen arranged to hold paper, a carriage whose operation is necessary before said type-carriers may be operated, means for operating said carriage, means for holding said type-carriers in idle position, a shaft, means for turning said shaft in one direction effectively to release said type-carriers, means for operating any type-carriers permitted by said carriage to be operative when said shaft is turned as aforesaid, and automatic means for operating said shaft and said type-carriers and said carriage to their idle positions after said shaft has been operated as aforesaid, substantially as specified.

143. In an adding machine, a series of type-carriers, a carriage whose operation is necessary before said type-carriers may be operated, a shaft controlling said type-carriers, means for turning said shaft to cause said type-carriers to operate after said carriage has been moved, automatic means for returning said shaft and said type-carriers to idle position after each operation as aforesaid, means cushioning the return of said shaft and said type-carriers, and a repeat device preventing the return of said carriage, substantially as specified.

144. In an adding machine, a series of type-carriers, a carriage whose operation is necessary before said type-carriers may be operated, means for moving said carriage, a shaft controlling said type-carriers, means for operating said shaft, means for operating said type-carriers after said carriage has been moved and when said shaft is operated, automatic means for returning said shaft and said type-carriers and said carriage to their idle positions, cushioning devices arranged to prevent too rapid return of said parts, a repeat device operable at will to prevent return of said carriage when said shaft and said type-carriers return to their idle positions as aforesaid, and a key operable to return said carriage to its idle position, substantially as specified.

145. In an adding machine, a platen arranged to hold paper, a series of arcuate type-carriers, a hammer arranged to coöperate with each type-carrier effectively to record numbers on paper on said platen, a carriage whose operation is necessary before said type-carriers and said hammers may be operated, means holding inoperative all other hammers than those permitted by said carriage to be operated, and automatic means for returning said hammers and said type-carriers and said carriage to idle position after each operation, substantially as specified.

146. In an adding machine, a series of type-carriers, a hammer coöperatively related with each type-carrier whereby numbers may be recorded, a carriage whose operation is necessary before said type-carriers and said hammers may be operated, means holding inoperative all other hammers than those permitted by said carriage to be operated, means for causing said type-carriers and said hammers to record any desired numbers, and means for adding the numbers recorded, substantially as specified.

147. In an adding machine, a series of hammers, a series of type-carriers, a carriage whose operation is necessary before said hammers and said type-carriers may be operated, means for operating said type-carriers and hammers effectively to record various numbers, means holding inoperative all hammers whose operation is unnecessary in the recording of numbers, automatic means for returning said hammers and said type-carriers and said carriage to idle position, and a manually operative device for returning said carriage to idle position independently of the operation of said type-carriers, substantially as specified.

148. In an adding machine, a laterally-movable platen arranged to hold paper, a series of type-carriers, a series of hammers arranged to coöperate with said type-carriers effectively to record various numbers on said paper, a carriage whose operation is necessary before said hammers and type-carriers may be operated, and means holding inoperative all hammers whose operation is unnecessary in the recording of the various numbers, substantially as specified.

149. In an adding machine, a series of arcuate type-carriers, a series of type mounted on each type-carrier and having their printing faces inside the arcs of said carriers, a hammer coöperatively related with each type-carrier, a carriage whose operation is necessary before said type-carriers may be operated, means for operating the required number of said type-carriers and hammers in coöperation so that said hammers will drive said type inwardly so as to print on paper on said platen, and means holding inoperative all hammers whose operation is unnecessary in the printing of any numbers, substantially as specified.

150. In an adding machine, a platen arranged to hold paper, a series of type-carriers, a series of hammers, latching devices for said hammers, and a carriage selecting which of said type-carriers and said hammers may be operated, and means for operating said type-carriers and hammers effectively to record numbers, substantially as specified.

151. In an adding machine, a series of type-carriers, a series of hammers, a latch for each hammer, a carriage whose operation is necessary before said hammers may be operated, and means for operating any selected number of said type-carriers and hammers effectively to record various numbers while the remaining hammers remain latched, substantially as specified.

152. In an adding machine, a carriage, means for setting up numbers in said carriage, an escapement shaft entrained with said carriage, mechanism for recording the numbers set up in said carriage, a key, and connections from said key to said escapement shaft whereby said shaft may be operated effectively to move said carriage to its idle position, substantially as specified.

153. In an adding machine, a carriage, means for setting up numbers in said carriage, an escapement shaft entrained with said carriage, means for moving said carriage incidentally to the setting up of numbers therein, mechanism for recording the numbers set up in said carriage, automatic means for returning said carriage to its idle position after each number has been recorded, a key, and connections from said key to said escapement shaft whereby said shaft may be operated effectively to move said carriage to its idle position independently of the operation of said recording mechanism, substantially as specified.

154. In an adding machine, a series of type-carriers, a hammer for each type-carrier, a latch device for each hammer, a carriage operable to permit any desired number of said type-carriers and said hammers to be operated, means for releasing the same number of hammers as there are type-carriers which operate, automatic means for returning said hammers and said type-carriers to idle position, a cushioning device preventing too rapid return of said type-carriers, and key mechanism operable to move said carriage to its idle position, substantially as specified.

155. In a machine of the character described, word printing mechanism, a laterally movable platen, adding mechanism, type-carriers separate from the word printing mechanism, a carriage, means for moving said carriage, means for alining any desired type on the type-carriers adjacent to the platen aforesaid after said carriage has been moved, means for driving the type so alined against the platen to print numbers, and means for operating the adding mechanism to add the numbers so printed, substantially as specified.

156. In an adding machine, a platen, type-carriers, type mounted in frames on the carriers, a carriage, means for moving said carriage, devices for positioning the type-carriers adjacent to the platen after said carriage is moved, hammers for driving the type against the platen to print numbers, and mechanism operable to add the numbers so printed, in combination with mechanism operable to print any desired words on the platen in suitable relation to the printed numbers, substantially as specified.

157. In an adding and writing machine, a platen, mechanism operable to print words thereon, type-carriers movable adjacent to the platen, a carriage, means for moving said carriage, means to stop the type-carriers in recording position after said carriage is moved, type on the carriers, hammers operable to drive the type against the platen to print, and devices operable to rotate the platen after the type make a record, substantially as specified.

158. In an adding and writing machine, a platen, typewriting mechanism operable to print thereon, devices carrying type for recording numbers, a carriage, means for moving said carriage, means for positioning said type-carrying devices adjacent to said platen after said carriage moves, hammers mounted in position to drive the type against the platen, and means for striking the hammers against the type after the type has been positioned adjacent to the platen, substantially as specified.

159. In an adding and writing machine, a platen, movable devices carrying type, a carriage, means for moving the carriage, and hammers operable to drive the type to record after the carriage has been moved, in combination with type-bars, and keys for operating them to record on the platen aforesaid, substantially as specified.

160. The combination with a platen, and typewriting mechanism operable to record thereon, of devices carrying type independent of the typewriting mechanism movable adjacent to the platen, a movable carriage, means effective to stop the type-carrying devices adjacent to the platen after movement of said carriage, and hammers operable to drive the type to record, substantially as specified.

161. In an adding and writing machine, word printing mechanism having a platen, type-carriers separate from the word printing mechanism, a movable carriage, and hammers operable to drive the type in the carriers to record on the platen aforesaid after said carriage moves, substantially as specified.

162. In an adding and writing machine, word printing mechanism having a platen, type-carriers separate from the word printing mechanism, type on said carriers, a movable carriage, hammers operable to drive the type to print on the platen aforesaid after said carriage moves, and devices for drawing the hammers away from the type after operation, substantially as specified.

163. In an adding and writing machine, word printing mechanism having a platen, type-carriers separate from the word printing mechanism, a movable carriage, devices for operating the type-carriers after the said carriage moves, hammers for driving the type to print on the platen aforesaid, and adding mechanism operable to add the numbers so printed, substantially as specified.

164. In an adding and writing machine, the combination with the word printing mechanism having a platen arranged to carry paper, of devices carrying type independent of the word printing mechanism, a movable carriage, means for moving said devices toward the platen as required for printing numbers thereon after said carriage is moved, means for printing the number by use of the type after said devices have been so moved, and adding wheels operable to add the printed numbers.

165. In an adding and writing machine, the combination with word printing mechanism having a platen arranged to carry paper, of devices carrying type independent of the word printing mechanism, a movable carriage, means for moving said devices to printing position adjacent to the platen as required for printing numbers after said carriage is moved, means for recording after said devices stop adjacent to the platen, adding wheels, and means for operating the same to add the numbers recorded.

166. The combination with word printing mechanism having a platen arranged to carry paper, of type-carriers separate from the word printing mechanism, a series of relatively movable type carried by each type-carrier, a movable carriage, means for moving the type-carriers toward the platen after movement of the carriage, stops to limit movement of type-carriers, and means for driving the type to print.

167. The combination with word printing mechanism having a platen arranged to carry paper, of devices carrying type independent of the word printing mechanism, a movable carriage, means to aline certain of the type carried by said devices adjacent to the platen aforesaid after the carriage moves, means for driving the type so alined against said platen to print, and automatic means for rotating the platen after the type have been driven to print, substantially as specified.

168. A platen arranged to hold paper, and word printing mechanism operable to record thereon, in combination with type-carriers separate from the word printing mechanism, vertically movable stops, a carriage operable to set said stops, and means to record by use of the type carried by said type-carriers.

169. A platen arranged to hold paper, and word printing mechanism operable to record thereon, in combination with type-carriers separate from the word printing mechanism, means to hold said type-carriers in the path of movement of the word printing mechanism and thereby prevent simultaneous operation of both the word printing mechanism and the said type-carriers, and means for causing the type carried by said type-carriers to record while held as aforesaid.

170. An adding and writing machine comprising a laterally-movable platen, typewriting mechanism operable to record on said platen, type-carriers separate from the typewriting mechanism, means for releasing the platen, automatic means for moving said platen to position to receive records from said type-carriers when released after the typewriting mechanism operates, means for moving said type-carriers toward the platen, mechanism to stop and hold the type-carriers stationary, and devices for causing the type to record while said type-carriers are stationary, substantially as specified.

171. An adding and writing machine comprising typewriting mechanism, and a platen therefor, in combination with type-carriers separate from the typewriting mechanism operable to record on said platen, and automatic mechanism to position the platen to receive records from said type-carriers after operation of the typewriting mechanism.

172. An adding and writing machine comprising a platen, typewriting mechanism operable to record thereon, type-carriers separate from the typewriting mechanism, automatic mechanism to position the said platen to receive records from the type-carriers after operation of the typewriting mechanism, and mechanism to cause the type-carriers to record on said platen, substantially as specified.

173. An apparatus of the character described comprising a platen, and word printing mechanism operable to print on said platen, in combination with a series of type independent of the word printing mechanism, means for holding said type adjacent to the platen intermediate of the sides of the word printing mechanism, and mechanism supported intermediate of the sides of the machine operable to drive the type supported as aforesaid to record on said platen.

174. An apparatus of the character described comprising a platen, and word printing mechanism operable to print on said platen, in combination with a series of type-carriers independent of the word printing mechanism, mechanism for operating said type-carriers to record numbers on said platen intermediate of the sides of the word printing mechanism, and adding mechanism rearward from the actuating members of the word printing mechanism operable to add the numbers recorded.

175. An apparatus of the character described comprising a platen, and word printing mechanism having a space intermediate of its sides, in combination with a series of type-carriers separate from the word printing mechanism, mechanism for operating said type-carriers in said space which is intermediate of the sides of the word printing mechanism, means for stopping the type-carriers in printing position adjacent to the platen, and devices for driving the type on said carriers to record on said platen after the type-carriers stop.

176. An apparatus of the character described comprising a platen, type-bars, devices operable to cause the type-bars to print on the platen, type-carriers separate from the type-bars aforesaid, tabulating mechanism operable to move the platen to present different columns of paper to the said type-carriers, adding mechanism, and means for operating said adding mechanism after the type-carriers operate to record.

177. The combination of a series of movable type-carriers, a number of relatively movable types on each carrier, means for positioning any of the types on two or more carriers side by side for printing, a platen arranged to carry paper, keys, and mechanism adjustable by each key to limit movement or one or more type-carriers, substantially as specified.

178. The combination with a platen arranged to carry paper, a series of type-carriers, means for moving the type-carriers toward the platen to position the required types side by side for printing, and means for causing the type to make impressions on the paper on the platen, of a series of keys, a transversely movable carriage, parts in the carriage adapted to be moved by operation of the keys, and means intermediate of the carriage and type-carriers to limit movement of the latter toward the platen.

179. The combination with a platen arranged to carry paper, of a series of type-carriers, a series of keys, means for moving the type-carriers toward the platen to position the types on the different type-carriers side by side for printing, mechanism whereby successive operations of each key will cause the required types on two or more type-carriers to stop side by side in position to print, and means for causing the types to print on the paper on the platen after the types have been positoined.

180. The combination in an adding machine, with a platen arranged to carry paper, of a series of types intended to be positioned side by side for printing, mechanism for moving the types to printing position, a series of keys, mechanism whereby successive operations of each key will cause two or more types to stop side by side in printing position, and devices operable to drive the types to print after they have been stopped side by side, substantially as specified.

181. The combination in an adding machine with a revoluble platen arranged to carry paper, of a key, and recording mechanism operable to print two or more characters side by side on paper on the platen after said key has been successively operated, means for causing said recording mechanism to operate, and means for rotating said platen to feed the paper in line spacing.

182. The combination with a revoluble platen arranged to carry paper, of a series of type-carriers, a series of keys, a series of parts operable by each key equal in number to the number of type-carriers, and arranged to be moved one at a time by the corresponding keys, mechanism operable to move the type-carriers toward the platen, means whereby a number of type-carriers equal to the number of operations of one or more keys will be stopped side by side adjacent to the platen when moved, means to record after said type-carriers stop, and means for rotating said platen to feed the paper in line-spacing, substantially as specified.

183. The combination with a revoluble platen arranged to hold paper, of a series of type-carriers, a series of keys, mechanism operable to move the type-carriers toward the platen, a series of parts operable by each key, means whereby a number of type-carriers equal to the number of operations of one or more keys will be stopped side by side adjacent to the platen when said type-carriers are moved, automatic mechanism operable to print on paper held by the platen after the type-carriers stop adjacent thereto, and automatic means to rotate said platen to feed the paper in line spacing, substantially as specified.

184. Recording mechanism comprising a revoluble platen arranged to hold paper, a series of type-carriers, a key, mechanism operable to move the type-carriers toward the platen, a series of parts equal in number to the number of type-carriers arranged to be moved at a time when said key is successively operated, means whereby a number of type-carriers equal to the number of said parts so moved will be stopped side by side adjacent to the platen when said type-carriers are moved, automatic means to record on the platen after said type-carriers stop, and automatic means to rotate said platen to feed paper in line spacing, substantially as specified.

185. Recording mechanism comprising a revoluble platen arranged to hold paper, a series of type-carriers, a key, a series of parts equal in number to the number of type-carriers, means whereby said parts will be moved one at a time by successive operations of said key, mechanism operable to move the type-carriers toward the platen, means whereby a number of type-carriers equal to the number of said parts moved by said key will be stopped side by side adjacent to the platen, mechanism for recording on paper held by the platen after the type-carriers stop, and automatic means to rotate said platen in line spacing, in combination with adding wheels, and means for operating them to add numbers recorded by the recording mechanism, substantially as specified.

186. In an adding machine, a revoluble platen arranged to hold paper, a series of type-carriers, means to move the type-carriers toward the platen, a series of stops, a carriage, mechanism for operating the carriage as required to position any desired stops, means to engage with the positioned stops to stop side by side adjacent to the platen those type-carriers which are moved, means to record on paper held by the platen after the type-carriers stop, and automatic means to rotate said platen to feed the paper in line spacing, substantially as specified.

187. In an adding machine, a platen arranged to hold paper and having the printing side visible to the operator, sectors pivoted in position to embrace the platen within the arcs thereof, type mounted on said sectors and having their printing ends within the arcs of the sectors, mechanism operable to move the sectors as required to position any desired type adjacent to the visible surface of the platen, and means for causing the type to print on said surface after said type have been positioned, substantially as specified.

188. An adding machine comprising a visible platen, type-carriers, means to position the type-carriers for printing, means to print after they have been positioned, and total mechanism operated by the type-carriers.

189. The combination with a laterally-movable platen arranged to hold paper, of a series of type-carriers, means to move the type-carriers toward the platen as required to record, a transversely movable carriage, a series of stops, and means for moving the carriage to position the stops to limit movement of the type-carriers toward the platen, substantially as specified.

190. A laterally-movable platen arranged to hold paper, in combination with two or more type-carriers, means to move said type-carriers toward the platen to record on paper thereon, and a transversely movable carriage operable to limit movement of the type-carriers toward the platen, substantially as specified.

191. The combination with a laterally-movable platen arranged to hold paper, and a series of type-carriers adapted to be moved side by side to record, of a transversely movable carriage operable to limit movement of the type-carriers when they are moved to record, substantially as specified.

192. The combination with a laterally-movable platen arranged to hold paper, and a series of type-carriers adapted to move side by side, of a series of stops to limit movement of the type-carriers when said type-carriers are moved to record, and a movable carriage operable to position said stops to limit movement of type-carriers.

193. The combination with a laterally-movable platen arranged to hold paper, and a series of type-carriers arranged to be moved side by side to record two or more characters side by side, of a series of stops to limit movement of the type-carriers when they are moved to record, a movable carriage operable to position said stops to limit movement of the type-carriers, and means to operate the platen to feed the paper in line spacing, substantially as specified.

194. The combination with a platen arranged to hold paper, and a series of type-carriers arranged to be moved side by side to record two or more characters side by side on paper against the surface of the platen, of a series of stops to limit movement of the type-carriers, a movable carriage operable to position said stops to limit movement of the type-carriers, and an operating handle, substantially as specified.

195. The combination with a platen arranged to hold paper, and a series of arcuate type-carriers arranged to be moved side by side to record two or more characters side by side, of a series of stops to limit movement of the type-carriers, a carriage operable to position said stops, and automatic means for restoring said type-carriers to idle position, substantially as specified.

196. In an adding machine, a series of keys, a series of type-carriers, a series of stops, a carriage, a platen arranged to hold paper, means for operating the type-carriers to record on paper against said platen, means for positioning any desired stops to limit movement of the type-carriers through joint operation of the keys and the carriage, and automatic means for restoring said type-carriers to idle position, substantially as specified.

197. In an adding machine, a platen arranged to hold paper, a series of type-carriers operable to record numbers on paper against the platen, a series of stops adapted to be positioned to limit movement of the type-carriers, a carriage, means for moving the carriage to position any desired stops, and automatic means for rotating said platen and for returning said type-carriers to idle position after each record.

198. In an adding machine, a platen arranged to hold paper and having its printing line in normal position visible to the operator, type-carriers, means for moving the type-carriers adjacent to the platen to position any desired type along the printing line, means for holding said type-carriers stationary while so positioned, hammers for driving the type to print, and means for drawing the type-carriers away from the platen after printing.

199. The combination in an adding machine, of a platen arranged to carry paper and having the printing line visible to the operator, type-carriers, type carried by said type-carriers, means for moving the type-carriers toward the platen, means to control the type-carriers so that any desired type will be presented at the visible printing line of the platen, hammers, means for causing the hammers to drive the type to produce visible records on the platen, means for restoring said hammers to idle position, and devices for restoring all of said type-carriers to idle position, substantially as specified.

200. In an adding machine, a platen arranged to carry paper, type-carriers, type movably carried by said type-carriers, gear parts in connection with the type-carriers, adding wheels, means for operating the type-carriers to present any desired type adjacent to the printing line on the platen, a carriage, means for moving said carriage, means controlled by the carriage to limit movement of the type-carriers, a key for moving the carriage to idle position without moving the type-carriers, and hammers for driving the type at the printing line to record.

201. In an adding machine, a carriage, stops in the carriage, keys for moving the stops, means for moving the carriage, type-carriers, gear parts, means for moving the type-carriers and gear parts so that the gear parts will engage with the stops that had been moved, a platen, hammers, means for operating the hammers to drive the type against the platen, and a key for moving the carriage to idle position without moving the type-carriers.

202. In an adding machine, a platen to hold the paper, type-carriers, type held by said type-carriers, gear parts, a carriage, stops in the carriage, keys for moving the stops, means for moving the carriage when the keys operate, means for moving the type-carriers and gear parts to engage the gear parts with the stops which had been moved, hammers, means for causing the hammers to drive the type to record, a key for moving the carriage without moving the type-carriers, and means for restoring the stops to idle position when the carriage is moved by said key.

203. The combination in an adding machine of separately movable gear and type-carrying parts, a movable carriage having projections, means for moving the carriage and projections to limit throw of the type-carrying parts, printing devices controlled by the type-carrying parts for printing numbers, adding wheels operated by the gear parts, common alining devices for the gear parts and adding wheels, and means for moving the gear parts farther than their normal position in order to carry from a lower to a higher order in the adding wheels, substantially as specified.

204. In an adding machine a frame having a series of key controlled stops, means for moving the frame and stops, gear parts movable into engagement with the stops, separately movable type-carriers operated with the gear parts, alining pawls holding the gear parts against backward movement, and printing devices for printing numbers when the said type-carriers are operated, substantially as specified.

205. In an adding machine the combination of wheels operable to add, gear parts, alining pawls for said wheels and gear parts, means whereby the said pawls and gear parts will carry from lower to higher orders in the adding wheels, and a movable carriage having projections to stop the gear parts, substantially as specified.

206. In an adding machine, separate movable gear and type parts, a carriage, stops in the carriage, means for moving the carriage so that the stops will limit movement of the gear and type-parts, adding mechanism comprising wheels and pawls, the wheels being rotated by the gear parts and the pawls alining both the wheels and the gear parts, means for operating the pawls by the said wheels, and means whereby the gear parts will be moved and carrying accomplished from lower to higher orders when said pawls are operated, substantially as specified.

207. In an adding machine, a movable frame, stops therein, separately movable gear and type parts, means for moving the gear parts into engagement with the stops, adding wheels normally in communication with the gear parts, but disconnected therefrom when a number is being recorded, a key, and means whereby the adding wheels will be held in connection with the gear parts when the said key is operated so that the total will be recorded, substantially as specified.

208. In an adding machine, a laterally-movable frame, stops therein, keys controlling the stops and frame, recording mechanism comprising a platen and type and hammers, movable gear parts controlling said mechanism and adapted to engage with said stops, adding wheels operated by said gear parts, and devices controlled by the adding wheels for alining both the gear parts and the adding wheels when the machine is clear, substantially as specified.

209. In an adding machine, gear parts, separately movable type-carriers controlled thereby, a platen, means for moving said type-carriers to record on the platen, a carriage having projections, means for moving said carriage and projection to limit movement of the type-carriers, adding wheels operated by the gear parts, and suitable members for alining both the wheels and gear parts, but movable at intervals, whereby the gear parts will carry from lower to higher orders, substantially as specified.

210. In an adding machine, movable gear parts, separately movable type-carriers connected therewith, a carriage having projections, means for moving the carriage and projections to limit movement of the gear parts, total wheels operated by the gear parts, alining devices for the gear parts and wheels and operated by the latter at intervals, and means whereby the wheel of the next higher order will be advanced whenever a wheel of a lower order operates its alining member, substantially as specified.

211. In an adding machine, a platen, type-carriers for recording numbers on the platen, separately movable gear attachments controlling the type-carriers, a carriage having projections, means for moving the carriage and projections to limit movement of the gear attachments, adding mechanism operated by the gear attachments, and means whereby the gear attachments will carry from lower to higher orders in the adding mechanism, substantially as set forth.

212. In an adding machine, sectors having joint and separate movement, movable type carried by certain of said sectors and having their type ends inside the sectors, a platen located within the arc of the sectors, means for operating the sectors and type toward the platen, hammers for driving the type to print, a transversely movable carriage, and stops on said carriage to limit movement of the sectors, substantially as specified.

213. In an adding machine, a visible platen, type-carrying parts movable to the visible surface of the platen, a movable carriage having projections for limiting movement of the type-carrying parts, hammers, and means for operating them to drive the type to print on the visible surface of the platen when the type-carrying parts are so moved, substantially as specified.

214. In an adding machine, sectors carrying inwardly movable type, a platen within the arc of the sectors and having a portion of its front side visible, devices for controlling the movement of the sectors to the visible surface of the platen, hammers operable to drive the type to print on the visible surface of the platen when the sectors are moved thereto, and mechanism operable to add the numbers as printed, substantially as specified.

215. The combination in an adding machine, of a carriage and stops therein, gear parts, means for moving the carriage and the stops and the gear parts relatively so that the latter will engage with the stops, a platen arranged to carry paper, having a visible printing line, and devices for printing on the visible printing line on the platen when the gear parts are operated, so that the items printed will be visible to the operator after said parts move back to position, without moving the platen, substantially as specified.

216. An adding machine having a series of keys, a series of stops for each key, and movable devices for carrying the stops transversely in the machine, in combination with separately movable gear and type-carrying parts the movement of which is limited by the said stops, substantially as specified.

217. An adding machine having a set of keys, a movable frame, a series of stops in said frame corresponding to each key, and means for moving the said stops and frame when the keys are operated, in combination with separately movable gear and type-carrying parts, and means for moving the same so that the gear parts will engage with the stops and thereby limit the movement of the type-carrying parts, substantially as specified.

218. An adding machine having a transversely-movable frame and stops carried therein, devices for moving said frame and stops, movable gear parts adapted to engage with the stops, separately movable type-carriers controlled by the gear parts, adding mechanism operated by the gear parts, substantially as specified.

219. The combination in an adding machine, of transversely movable stops, movable gear parts adapted to engage with the stops, separately movable type-carriers controlled by the gear parts, adding mechanism operated by the gear parts, and printing devices automatically operated to print the numbers represented by the type-carriers, substantially as specified.

220. The combination in an adding machine, of transversely movable stops, keys for operating said stops, movable gear parts adapted to engage with the stops, separately-movable type-carriers controlled by the gear parts, adding mechanism operated by the gear parts, and printing devices automatically operated to print the numbers represented by the type-carriers, substantially as specified.

221. In an adding machine, a transversely movable frame, stops therein, keys for operating them and causing the carriage to move, movable type-carriers, the movement of which is limited by the stops, automatic means for restoring the type-carriers and frame to idle position, and means for restoring the stops to idle position without moving the type-carriers, substantially as specified.

222. In an adding machine, a series of transverse rows of stops, a key for each row, means for moving any number of stops in a row by a single key, gear parts, means for moving them to engagement with the stops, means for printing a number when such operation occurs, adding wheels, common alining devices for the gear parts and adding wheels, and means for operating the same and carrying from a lower to a higher order in the adding wheels, by the movement of the gear parts, substantially as specified.

223. In an adding machine, type-carriers, gear parts controlling same, a movable carriage having projections to limit movement of the gear parts, adding mechanism controlled by said gear parts, alining levers common to the adding mechanism and gear parts, and means for carrying from lower to higher orders in the adding mechanism by the movement of the gear parts, substantially as specified.

224. In an adding machine, type-carrying sectors, a platen having its printing line visible to the operator within the arc of said sectors, means for moving the sectors to the visible surface of the platen, and printing hammers controlled by said sectors and adapted to drive the type against the platen to produce visible records thereon, substantially as specified.

225. In an adding machine, a transversely-movable frame, stops located therein, independently supported type and gear parts, devices for engaging the gear parts and stops, and printing hammers controlled by the type-parts for striking the type, substantially as specified.

226. In an adding machine, a platen, gear and type sectors separately movable and independently supported, a carriage controlling said gear and type sectors, adding wheels meshing with the gear sectors, and carrying levers for alining the gear sectors and wheels and movable at intervals by the latter, thereby permitting the gear sectors to move farther than their normal position to carry from lower to higher orders in the adding wheels, substantially as specified.

227. In an adding machine, gear and type-carrying parts, a carriage, stops therein, devices for moving the carriage and stops to stop the gear parts, adding wheels, carrying levers for holding the wheels in normal position, trips whereby the adding wheels will operate the levers at intervals, and means whereby the gear parts will carry from lower to higher orders in the adding wheels when the levers are so moved, substantially as specified.

228. In an adding machine, the combination with a recording mechanism comprising type and gear parts, of a transversely movable carriage having projections to limit movement of the gear parts, adding wheels, pawls alining both the wheels and the gear parts, and trips to operate the pawls and release the gear parts so they can carry from lower to higher orders, substantially as specified.

229. In an adding machine, recording mechanism, a frame having projections, devices for moving said frame and projections to limit movement of the recording mechanism, adding wheels operated by the recording mechanism, carrying levers alining the said wheels normally, and trips whereby the wheels will move the carrying levers and allow part of the recording mechanism to move backward farther than its normal position and thereby carry from lower to higher orders, substantially as specified.

230. In an adding machine, sectors carrying type movable inward, a visible platen located within the arc of said sectors, and devices for operating the sectors and driving the type into communication with the visible side of the platen, substantially as specified.

231. In an adding machine, a series of type-carriers, and means for moving them, in combination with separately-movable gear attachments connected to the type-carriers, a movable carriage, a series of stops located in said carriage, means for connecting the stops and gear attachments to limit the movement of the latter and also the type-carriers, and adding wheels operated by the gear attachments, substantially as specified.

232. In an adding machine, the combination of two parts, one carrying type and the other being a gear member, means for moving the former independently of the latter a given distance and then moving both parts together, an adding wheel actuated by the movement of the gear part to add, and a carrying lever which also alines the adding wheel and the gear part in normal position, substantially as specified.

233. In an adding machine, a carriage, means for setting up numbers in said carriage, means for moving said carriage, an escapement mechanism controlling movement of said carriage, a key, and connections from said key to said escapement mechanism whereby said carriage may be moved to idle position.

234. The combination with a platen arranged to hold paper, typewriting mechanism operable to record on said paper, upper and lower case type in said typewriting mechanism, means holding said platen in position normally to receive records from said lower case type, and means for moving and holding said platen in position to receive records from said upper case type, of type-carriers separate from said typewriting mechanism, a series of type mounted on each of said type-carriers, devices for operating said carriers to aline any desired type adjacent to the platen, hammers for driving the type to print on the paper on said platen, and mechanism operable to add the numbers so printed, substantially as specified.

235. The combination with a platen arranged to hold paper, typewriting mechanism operable to record on said paper, upper and lower case type in said typewriting mechanism, means holding said platen normally in position to receive the records from the type of one case only, means for moving and holding said platen in position to receive the records from the type of the other case, and means for operating said typewriting mechanism, of type-carriers movable adjacent to the platen, movable type carried by said carriers, hammers for driving the type against the platen to print in alinement with the records of the typewriting mechanism, and devices operable to rotate the platen when the type-carriers operate, substantially as specified.

236. A machine of the character described, word print mechanism having a platen arranged to carry paper, adding mechanism, type-carriers separate from the word printing mechanism, a series of relatively movable type carried by each of said type-carriers, means for alining any desired type on the type-carriers adjacent to the platen, aforesaid, a single ribbon serving said word printing mechanism and the type on said type-carriers, means for driving the type alined, as aforesaid, against the said ribbon to print numbers, means for moving said ribbon when either the word printing mechanism or the type-carriers operate, and means for operating the adding mechanism to add the numbers printed by said type-carriers, substantially as specified.

237. The combination with word printing mechanism, having a platen arranged to carry paper, a ribbon supported adjacent to said platen, and means for operating said ribbon when said word printing mechanism operates, of type-carriers separate from the word printing mechanism, a series of relatively movable devices carried by each type-carrier, means for moving the type-carriers to printing position adjacent to said platen and said ribbon, means for operating said ribbon when the type-carriers operate, stops to limit movement of the type-carriers, and hammers for driving the type against the said ribbon to print, substantially as specified.

238. In an adding and writing machine, a platen arranged to carry paper, typewriting mechanism operable to print any desired words on said paper, devices carrying movable type for printing numbers, means for moving said devices adjacent to said platen, hammers mounted in position to drive type to print on paper on said platen, means for striking the hammers against the type after the type has been positioned for printing, and tabulating mechanism operable to position said platen to receive records from said type in different vertical columns of the paper, substantially as specified.

239. The combination of the platen arranged to hold paper, trains of typewriting mechanism operable to print any desired words on paper on said platen, each train of said mechanism containing upper and lower case type, mechanism for positioning said platen and said typewriting mechanism relatively so that any desired type in said trains may be caused to record, devices independent of the typewriting mechanism movable adjacent to said platen, a series of type carried by each of said devices, means for alining any desired type in printing position adjacent to said platen, hammers for driving the type to print and means for operating one hammer for each type that is in printing position while the remaining hammers remain inoperative, substantially as specified.

240. In an adding and writing machine, word printing mechanism having a platen, type-carriers separate from the word printing mechanism, type on said carriers, hammers for driving the type against the platen aforesaid, a single ribbon serving said word printing mechanism and said type-carriers, devices for drawing the hammers away from the type after operation, and tabulating mechanism for moving the platen to receive records in different vertical columns.

241. In an adding and writing machine, a platen arranged to carry paper, trains of type-writing mechanism operable to print any desired words on said paper, means for causing each of said trains to print in upper and lower case type as desired, type-carriers separate from said typewriting mechanism, a series of relatively movable type carried by each of said type-carriers, a single ribbon serving said typewriting mechanism and said type-carriers, means for alining any desired type on the type-carriers adjacent to the said platen and ribbon, means for driving the type so alined against said ribbon to print numbers, adding mechanism, and means for operating the adding mechanism to add the numbers so printed, substantially as specified.

242. An adding and typewriting machine comprising a platen arranged to hold paper, a ribbon supported close to said platen, a series of type-bars, an upper case type and a lower case type on each type-bar, means for moving and holding the platen in position to receive records from the upper case type or the lower case type as desired, and keys for operating said type-bars to print any desired words, in combination with a series of type-carriers separate from said type-bars, a series of type movably carried by each carrier, means for holding said type-carriers stationary in printing position close to said platen, hammers arranged to drive said type against said ribbon to print on paper on said platen, means for moving said type-carriers away from said platen, means for withdrawing said hammers from said type, and tabulating mechanism operable to position said platen to receive records from said type on said type-carriers in different vertical columns on the paper, substantially as specified.

243. In an adding machine, adding mechanism, a carriage, means for moving and setting up numbers in said carriage, racks for operating said adding mechanism, means for positioning said racks for adding operations, automatic means for operating said racks effectively to cause said adding mechanism to add the numbers set up in said carriage, automatic means for restoring said carriage to idle position incidentally to the adding of numbers, a key, and connections operated by said key to move said carriage to idle position, substantially as specified.

244. In an adding machine, a carriage, keys for setting up numbers in said carriage, means for moving said carriage, an escapement shaft controlling the movement of said carriage, a link connected to said escapement shaft, adding mechanism, means for operating said adding mechanism to add the numbers set up in said carriage, automatic means for moving said link and said escapement shaft to idle position incidentally to the operation of said adding mechanism, a key, a support for said key separate from said carriage, and connections whereby said key may operate said link effectively to restore said carriage to idle position, independently of the operation of said adding mechanism, substantially as specified.

245. In an adding machine, a carriage, keys for setting up numbers in said carriage, an escapement device for moving said carriage, mechanism for recording said numbers, means for operating said recording mechanism in one direction, automatic means for operating said recording mechanism in the other direction, adding mechanism operated during the automatic movement of said recording mechanism, means for restoring said carriage to idle position, a key, and movable connections actuated by said key for moving said carriage to idle position independently of said adding mechanism and recording mechanism, substantially as specified.

246. An adding and writing machine comprising a platen arranged to hold paper, type-bars, a plurality of type on each type-bar, and keys for causing any desired type on each type-bar to record on said paper, in combination with type-carriers separate from said type-bars, a series of movable type on each type-carrier, means for moving said type-carriers toward said platen, means to stop and hold said type-carriers stationary adjacent to said platen, a hammer for each type-carrier, means for holding said hammers in idle position, means for releasing the hammers which correspond to the type-carriers operated, and means for driving said hammers against the type on said type-carriers to record while said type-carriers are stationary, substantially as specified.

247. An adding and writing machine comprising a platen, type-bars having the letters of the alphabet engraved thereon, and mechanism for causing each of said type-bars to record the letter represented thereon in upper and lower case, in combination with type-carriers separate from said type-bars, keys whose operation is necessary before said type-carriers may be operated, means for moving said type-carriers toward the platen aforesaid after the said keys have been operated, means separate from said keys to stop said type-carriers adjacent to said platen, and means for driving the type carried by said type-carriers to print after said type-carriers stop and while said type-carriers are stationary, substantially as specified.

248. An adding and writing machine comprising a platen, mechanism operable to position any of said type in position to record on said platen, hammers, means holding said hammers in idle position, means for releasing one hammer for each type in recording position, means for driving the hammers which are released against the type to record after said type have been positioned, and a case inclosing said mechanism, in combination with type-bars supported in position to record on the said platen, key levers projecting into said case, and connections leading from said levers in the case to said type-bars whereby operation of the key levers will cause said type-bars to record on the platen aforesaid, substantially as specified.

249. An adding and writing machine comprising a platen, type-carriers, mechanism for operating said type-carriers as required to record on paper held by said platen, and hammers for driving the type on said carriers to record, in combination with a series of type-bars operable effectively to record on the same space whereon the type-carriers would record if operated, without lateral movement of the platen, there being a space in said series of type-bars to permit operation of the type-carriers aforesaid, substantially as specified.

250. The combination with mechanism operable to record numbers, a laterally-movable platen, a carriage for said platen, devices mounted in said carriage to coöperate with the platen to move the paper longitudinally in any position of the platen, keys arranged in a key-board, a carriage controlled by said keys, mechanism controlled by said carriage to control the operation of the recording mechanism, and mechanism operable to add the numbers after they have been recorded, respectively, of a set of keys arranged in the same keyboard with the first-named keys, and typebars operable by said last-named keys to record on paper held by said platen, substantially as specified.

251. An adding and writing machine comprising a platen arranged to hold paper, movable devices carrying type, hammers for driving the type to record on said platen, means for controlling and operating said hammers, and a case inclosing said movable devices, in combination with typebars supported above said case, keys whose levers project into the aforesaid case, and connections within said case leading to said type-bars whereby operation of the keys will cause said type-bars to record on the platen aforesaid.

252. An adding and writing machine comprising a laterally-movable platen arranged to hold paper, a series of type-carriers movable side by side to record two or more characters side by side on paper held by said platen, a series of keys, and mechanism whereby the scope of movement of any number of said type-carriers may be regulated by successive operations of each key, in combination with typewriting mechanism comprising keys separate from the aforesaid keys, and type-bars operable by said keys to record on the paper held by said laterally movable platen, substantially as specified.

253. An adding and writing machine comprising a laterally-movable platen arranged to hold paper, a series of type-carriers, means to move said type-carriers side by side toward said platen, a key for each of the nine digits or figures, mechanism whereby successive operations of each of said nine keys will cause two or more type-carriers to stop side by side when said type-carriers are moved to record, and means to cause said type-carriers to record after they have stopped, in combination with typewriting mechanism operable to record on the paper held by said laterally-movable platen, substantially as specified.

254. An integral adding and writing machine comprising a platen arranged to hold paper, type-carriers, type supported by said type-carriers, devices for moving the type-carriers adjacent to the platen, keys arranged in a key-board, mechanism separate from said keys to stop the type-carriers in position to record the numbers on paper held by said platen, and mechanism operable to add the numbers so printed, in combination with typewriter keys arranged in rows on the same key-board with the first-named keys, and mechanism operable by said keys to record on paper held by the aforesaid platen, substantially as specified.

255. An integral adding and writing machine comprising typewriting mechanism including a platen arranged to hold paper, and a set of keys arranged on a key-board, type-carriers separate from the typewriting mechanism, keys for said type-carriers arranged on the same key-board with the typewriter keys, hammers for driving the type on the type-carriers to record, and means for controlling and operating said hammers, substantially as specified.

256. An integral adding and writing machine comprising typewriting mechanism having a key-board and a platen, type-carriers separate from the typewriting mechanism, keys for said type-carriers arranged in the same key board with the typewriter keys, hammers for driving the type carried by said type-carriers to record, latches for said hammers, and means for releasing and operating said hammers, substantially as specified.

257. In an integral adding and writing machine, a base, two outer frames rigidly mounted on said base, a platen movable across said outer frames, type-carriers, type mounted in frames on the type-carriers, devices for operating the type-carriers adjacent to the platen, hammers for driving the type against the platen to print numbers, and mechanism operable to add the numbers so printed, all between said outer frames, in combination with mechanism operable to print any desired words on the platen in alinement with the printed numbers, said mechanism being between said outer frames.

258. In an integral adding and writing machine, a platen, a base, two outer frames mounted rigidly on said base across which said platen moves, mechanism between said two outer frames operable to print any desired words on said platen, type-carriers movable adjacent to the platen aforesaid, movable type carried by said carriers, hammers for driving the type against the platen to print in alinement with the words, all between said two outer frames, and devices operable to rotate the platen when said type-carriers operate.

259. An integral adding and writing machine comprising a base, two outer frames rigidly mounted on said base, a platen mounted outside said frames, typewriting mechanism operable to print any desired words on said platen, devices carrying movable type for printing numbers, means for moving said devices adjacent to the platen, hammers mounted in position to drive the type against the platen, and means for striking the hammers against the type after the type have been positioned for printing, all of said parts except the platen being located between said two outer frames, substantially as specified.

260. In an adding and writing machine, a platen adapted to hold paper, type-carriers, type on the carriers, means for moving any desired number of said type-carriers toward the platen, means to stop and hold the type-carriers stationary side by side adjacent to the platen as required to aline any desired type in printing position, and means to drive the type to record while said type-carriers are stationary, in combination with type-bars for typewriting purposes, and mechanism for operating them effectively to record on the platen aforesaid while said platen is positioned centrally with respect to the aforesaid type-carriers.

261. In a machine of the character described, a platen arranged to carry paper, type-carriers, separately movable gear attachments operable in connection with the type-carriers, an operating handle, a spring for holding the handle in idle position, means controlled by the handle to engage with and hold the type-carriers and gear attachments in idle position, means for moving the type-carriers and gear attachments when the handle is moved, hammers for driving the type in or on the type-carriers to record on the platen, adding wheels, means controlled by the handle to cause said hammers to operate and to connect the total wheels with the gear attachments, and an escapement and motor device whereby the platen can be moved laterally relative to the type-carriers, substantially as specified.

262. In a machine of the character described, a platen, typewriting mechanism operable to print any desired words on paper held by the platen, type-carriers separate from the type-writing mechanism, means to move said type-carriers toward the platen, stops to limit movement of the type-carriers toward the platen, keys operable to arrange the stops in any desired adjustment, means to arrange a plurality of stops by separate operations of each key, and means to drive the type as required to print after the type-carriers stop.

263. In a machine of the character described, a platen, typewriting mechanism operable to print any desired words on the platen, type-carriers separate from the type-writing mechanism, means to move the type-carriers toward the platen, a key, and devices controlled by said key to limit movement of the type-carriers which move toward the platen.

264. In an adding machine, a type-carrier, a gear attachment to control the type-carrier, a platen arranged to carry paper, a carriage whose operation is necessary before said type-carrier and rack may be operated, and means, whenever record is to be made on the platen, to move the type-carrier as far as necessary to print "0" without movement of the gear attachment.

265. In an adding machine, type-carriers, a gear attachment to control each type-carrier, a series of laterally-movable stops for each gear attachment, a platen arranged to carry paper, and means, whenever record is to be made on the platen, to move the type-carriers as far as necessary to print "0" without movement of the gear attachments and then moving both together.

266. In an adding machine, type-carriers, a gear attachment to control the movement of each type-carrier, a series of laterally-movable stops for each gear-attachment, a platen arranged to carry paper, means to move the type-carriers to "0" printing position without movement of the gear attachments and then moving both together, and total wheels operated by the gear attachments.

267. In an adding and writing machine, a platen, U-shaped type-bars, and devices to operate them to print on the platen, in combination with type-carriers for producing arithmetical records, means for moving them to and from the platen, and adjustable stops to limit movement of the type-carriers toward the platen.

268. The combination of the platen, type-carriers movable toward the platen, stop devices adjustable to regulate the scope of movement of the type-carriers, hammers for driving the type to record, adding mechanism to add the numbers recorded, and a series of substantially U-shaped type-bars having key connections for operating purposes, said type-bars being arranged to record in the same line with the numbers recorded as aforesaid.

269. An adding and writing machine comprising a platen, devices for recording words on the front of the platen intermediate of the sides of the machine, separate devices for recording numbers on the front of the platen intermediate of the sides of the machine, all of said words and numbers being visible as recorded, and adding wheels operable to add the numbers recorded.

270. In an adding and recording machine, adding mechanism keys and typewriting mechanism keys arranged in a single keyboard, type-bars arranged in two groups with an intervening space, type-carriers operable into said space, and stops governing the movement of the type-carriers into said space, substantially as specified.

271. An adding and recording machine comprising devices operable to print any desired words, a platen, type-carriers located under the platen, devices for moving the type-carriers to the front of the platen, hammers operable to drive the type against the front of the platen, a ribbon serving both said word printing devices and said type, and means for feeding the ribbon transversely of the machine.

272. In an adding and writing machine, the combination with a platen, horizontally movable type-bars operable to record words and numbers, arcuate type-carriers, and an adding mechanism, of means for operating the type-carriers to print on the platen in alinement with the words, substantially as specified.

273. In combination, a machine having a writing department capable of writing any desired words and figures, and an adding department, with separate keys for each department, the type for the adding department being arranged on sectors, a single platen for both departments, and means for writing by both departments upon the front of the platen, to produce records by both departments midway of the sides of the machine, which will be visible to the operator after said parts move back to normal position, without moving the platen.

274. In an integral adding and writing machine, the combination of typewriter mechanism for printing words and numbers including a key board, separate mechanism for printing numbers including a series of keys separate from the first-named mechanism arranged in the same key board with the typewriter keys, a single platen for both mechanisms, mechanism for actuating said separate numbers-printing mechanism effectively to record upon said platen intermediate of the sides of the typewriter mechanism, a single ribbon, means for feeding said ribbon operated by said typewriting and numbers printing mechanisms, adding mechanism, and means for operating said adding mechanism to add each number recorded.

275. An integral adding and writing machine comprising a platen, typewriting mechanism having an open space intermediate of its sides, means for operating said typewriting mechanism to print on the platen, a series of type-carriers separate from the typewriting mechanism, mechanism for operating said type-carriers into said open space when the typewriting mechanism is idle, means to stop the type-carriers adjacent to the platen in said open space, and devices operable to drive the type to record on the said platen after the type-carriers stop, substantially as specified.

276. An integral adding and writing machine comprising a platen, a series of type-bars, mechanism for actuating said type-bars, a series of type-carriers separate from said type-bars, a movable carriage, means to set up or represent numbers in said carriage, mechanism for operating the type-carriers effectively to record the numbers set up or represented in the carriage, means for adding the numbers recorded, and means for clearing the number out of said carriage when the number is recorded.

277. An adding and writing machine comprising a platen, a series of type-bars each having a plurality of type thereon, means for operating said type-bars effectively to record any of the type thereon on said platen, type-carriers separate from said type-bars, means for moving them toward the platen, means to stop them adjacent to the platen, devices for recording after said type-carriers stop, means for returning said type-carriers to idle position, a ribbon, and mechanism for feeding said ribbon operated incidentally to the operation of said type-carriers.

278. The combination with a platen, a movable carriage, movable parts in said carriage, means to position said movable parts to represent numbers, a series of type-carriers, mechanism operable to move said type-carriers toward said platen, devices operable to cause the type on said type-carriers to record the numbers represented in said carriage, and means to move the platen laterally.

279. An adding machine comprising a laterally-movable platen, a carriage, means to set up or represent numbers in said carriage, mechanism operable to move said carriage, and recording devices operable to record the numbers represented in said carriage in any position of the platen.

280. An adding machine comprising a laterally-movable platen, a carriage, means to move said carriage, a series of type, mechanism operable to position said type as required to record the number represented in said carriage on said platen, and automatic mechanism to rotate the platen in line spacing.

281. The combination with a platen arranged to hold paper, a set of keys, and a series of type-carriers, of mechanism whereby two or more of said type-carriers may be operated side by side to record on paper held by said platen when any one of said keys is successively operated, and means for driving the type toward said platen after said type-carriers have been operated.

282. An adding machine comprising a platen to hold paper, a carriage, mechanism operable to introduce numbers in said carriage and to move the carriage laterally, mechanism operable to record said numbers on paper held by said platen, and mechanism operable to move the platen laterally.

283. An adding machine comprising a platen to hold paper, mechanism for moving said platen laterally, a carriage, means to set up or represent numbers in said carriage, means for moving said carriage, and means operable to record said numbers which are set up in said carriage on said platen.

284. In an adding machine, rails, a carriage, antifriction devices supporting said carriage on said rails, parallel series of pins in said carriage, keys operable to set said pins to represent numbers, mechanism operable to add said numbers, racks, means for positioning said racks for adding operations, automatic means for causing said racks to operate said adding mechanism, automatic mechanism for returning said carriage to idle position, incidentally to the adding of numbers, and separate devices supported separate from said carriage whereby said pins may be returned to idle position independently of the operation of said adding mechanism.

In testimony whereof, I have signed my name to this specification in the presence of two witnesses.

HUBERT HOPKINS.

Witnesses:
 MERCER ARNOLD
 J. D. RIPPEY.

---

Corrections in Letters Patent No. 1,039,130.

It is hereby certified that in Letters Patent No. 1,039,130, granted September 24, 1912, upon the application of Hubert Hopkins, of St. Louis, Missouri, for an improvement in "Adding and Writing Machines," errors appear in the printed specification requiring correction as follows: Page 2, line 68, for the word "bars" read *levers;* page 3, line 5, for the word "stops" read *pins;* same page, line 60, for the word "carriage" read *carriers;* line 68, for the word "arcs" read *arms;* lines 71 and 80, for the word "sectors" read *carriers;* lines 116–117 and 118, for the word "sectors" read *type-carriers and racks;* page 4, lines 20 and 23, for the word "bar" read *lever;* same page, line 112, for the word "sectors" read *carriers;* page 5, line 44, for the word "machine" read *mechanism;* page 14, line 51, for the word "in" read *under;* same page, line 63, strike out the words "determining which of" and insert the words *whose operation is necessary before;* and that the said Letters Patent should be read with these corrections therein that the same may conform to the record of the case in the Patent Office.

Signed and sealed this 3rd day of December, A. D., 1912.

[SEAL.]

C. C. BILLINGS,
*Acting Commissioner of Patents.*